(12) United States Patent
R et al.

(10) Patent No.: US 12,461,739 B2
(45) Date of Patent: Nov. 4, 2025

(54) SYSTEM AND METHOD FOR PERFORMING TENANT PROVISIONING

(71) Applicant: AppviewX Inc, New York, NY (US)

(72) Inventors: Ragunathan R, Ooty (IN); SunilKumar PR, Palakkad (IN)

(73) Assignee: AB PRIVATE CREDIT INVESTORS LLC, Austin, TX (US)

( * ) Notice: Subject to any disclaimer, the term of this patent is extended or adjusted under 35 U.S.C. 154(b) by 220 days.

(21) Appl. No.: 18/391,966

(22) Filed: Dec. 21, 2023

(65) Prior Publication Data

US 2024/0211237 A1    Jun. 27, 2024

Related U.S. Application Data

(60) Provisional application No. 63/435,177, filed on Dec. 23, 2022.

(51) Int. Cl.
| | |
|---|---|
| *G06F 9/455* | (2018.01) |
| *G06F 8/65* | (2018.01) |
| *G06F 8/71* | (2018.01) |
| *G06F 9/445* | (2018.01) |
| *G06F 9/52* | (2006.01) |
| *G06F 15/173* | (2006.01) |
| *G06F 16/28* | (2019.01) |
| *H04L 12/64* | (2006.01) |
| *H04L 29/08* | (2006.01) |

(52) U.S. Cl.
CPC ............... *G06F 8/65* (2013.01); *G06F 8/71* (2013.01); *G06F 16/285* (2019.01)

(58) Field of Classification Search
CPC . G06F 8/65; G06F 16/285; G06F 8/71; G06F 16/951; G06F 9/45558; G06F 9/50; G06F 9/5077; G06F 9/48; H04L 41/0895; H04L 41/0806; H04L 67/10
See application file for complete search history.

(56) References Cited

U.S. PATENT DOCUMENTS 9,755,858 B2 *   9/2017   Bagepalli ............... H04L 12/66
11,223,613 B2 *   1/2022   Das ..................... G06F 9/45558

* cited by examiner

*Primary Examiner* — Thuy Dao

(57) ABSTRACT

An embodiment herein provides a system and method for performing tenant provisioning to enable controlled and staged deployment of new versions of workload, application, or service across the multiple clusters. The method includes (a) creating a tenant in a cloud using a user metadata received from a plurality of user devices, (b) generating a tenant key based on tenant information and tenant metadata, (c) mapping a snapshot of the tenant database comprising the tenant metadata to the tenant key, (d) creating Domain Name System record, (e) uploading license and generating Key Management Service key simultaneously, and (f) enabling the controlled and staged deployment of the new versions of the workload, application, or service across multiple clusters by creating admin credentials. This system and method can be implemented in EKS—Elastic Kubernetes Service, GKE—Google Kubernetes Engine, and AKS—Azure Kubernetes Service managed services.

18 Claims, 21 Drawing Sheets

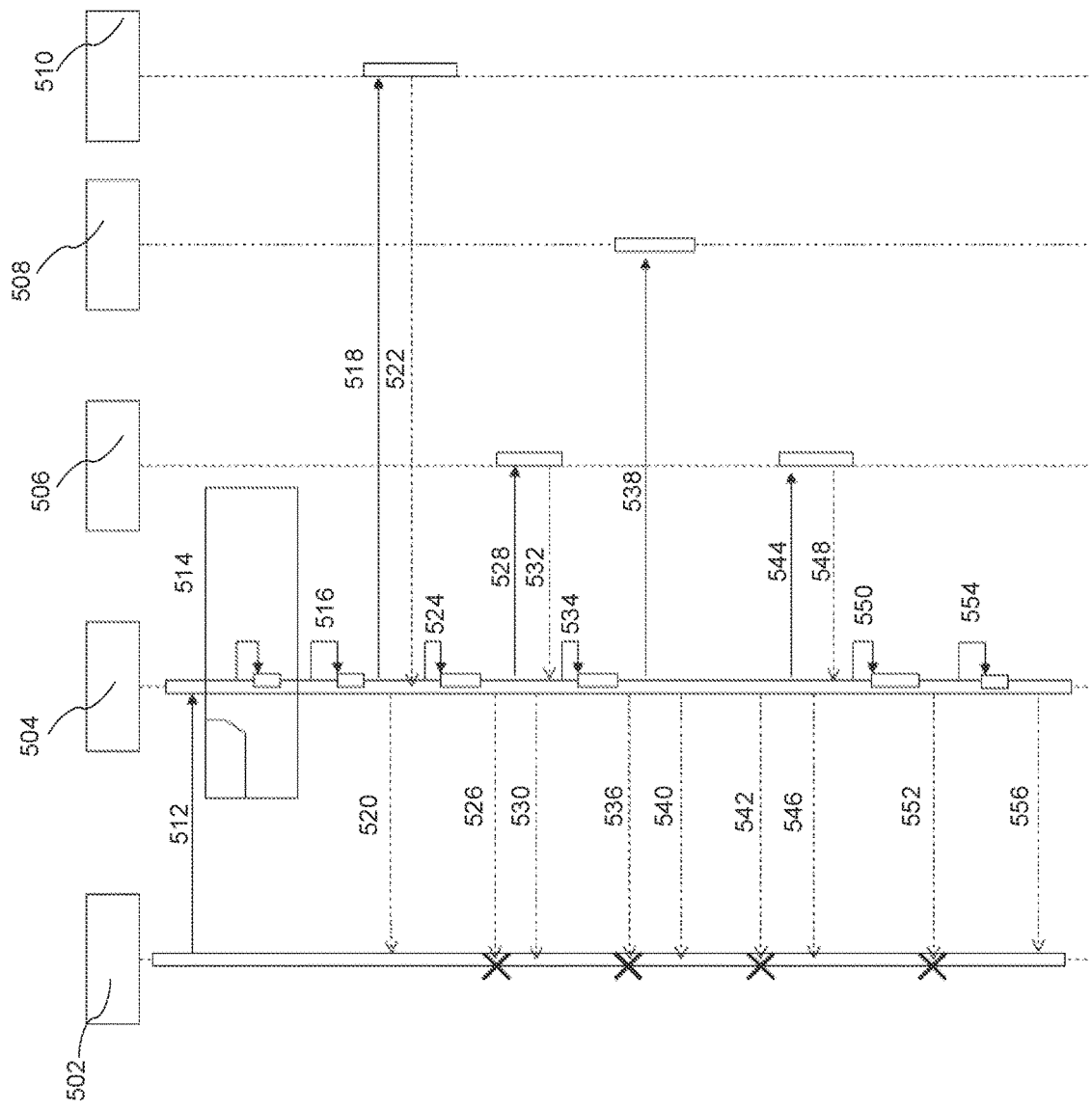

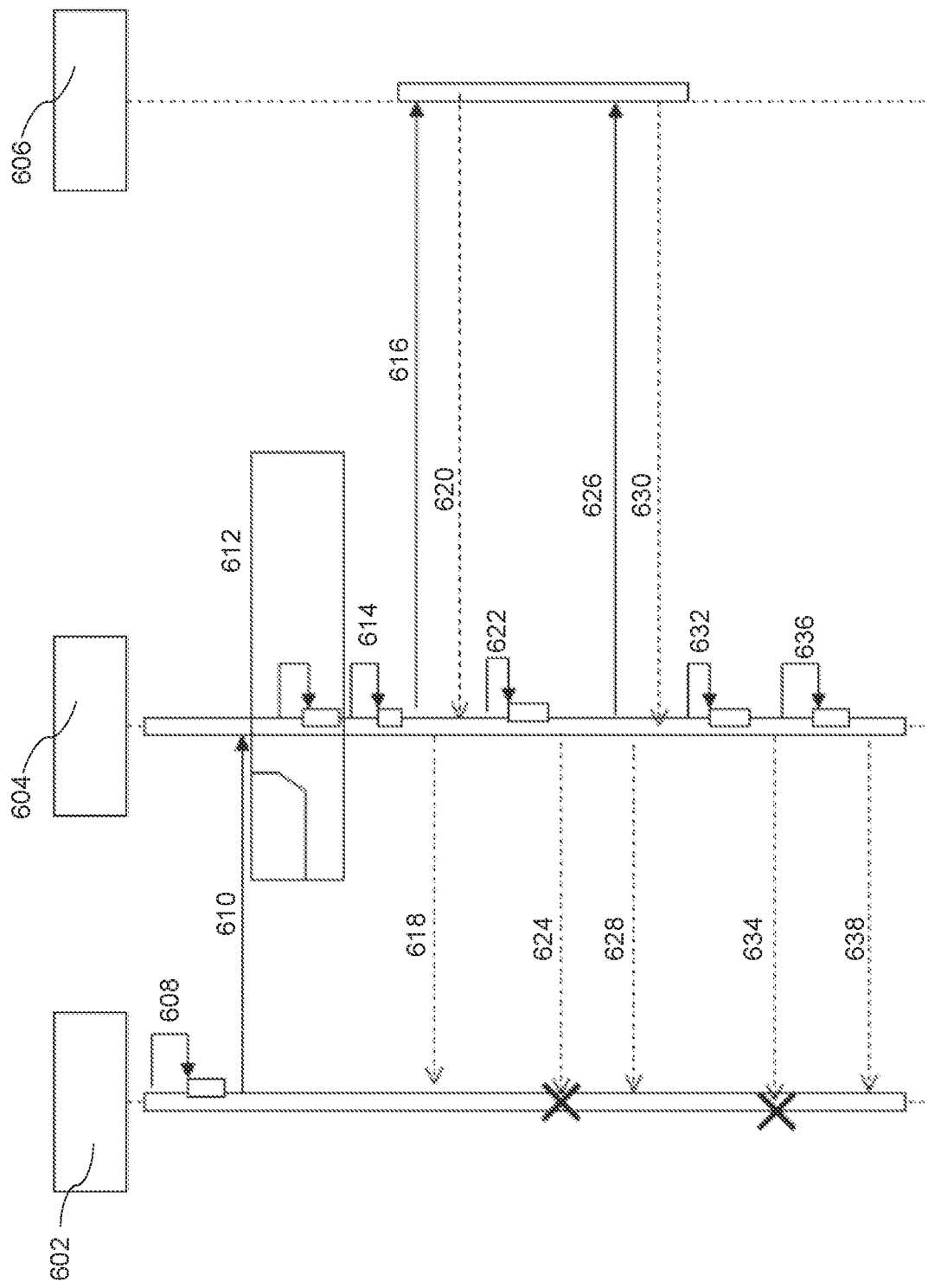

SYSTEM AND METHOD FOR PERFORMING TENANT PROVISIONING

BACKGROUND

Technical Field

The embodiments herein generally relate to a system and method for performing tenant provisioning to enable controlled and staged deployment of new versions of workload, application, or service across multiple clusters.

Description of the Related Art

A Cloud environment including cloud servers, cloud storage, cloud infrastructure, cloud computing, etc., enhances the available storage capacity and processing power of a hardware to assist a cloud service provider. Software as a Service (SaaS) is an application service provided to multiple users on-demand. Multi-tenant architecture for a SaaS application can serve multiple tenants utilizing a scalable, available, and resilient architecture. Accordingly, the work of a particular data stream for a given tenant can be assigned to a particular worker cluster node, where each worker cluster node can handle a configured number of job assignments. However, managing these work assignments does not scale well for large numbers of organizations and data streams.

In recent times, companies aim to spread their software-as-a-service (SaaS) applications, and workloads across public and private clouds to offer their services to customers at any time. With cloud orchestration, companies of all sizes can deploy information systems quickly and cost-effectively. Existing multi-cloud orchestration frameworks are either cloud-specific or require great expertise from the user to properly utilize them. Further, they do not always cover advanced deployment and adaptation scenarios.

Accordingly, there remains a need for a system and method for performing tenant provisioning to enable controlled and staged deployment of new versions of workload, application, or service across multiple clusters with a reliable level of efficiency and security.

SUMMARY OF THE INVENTION

According to the first aspect of the present invention, a system for performing tenant provisioning to enable controlled and staged deployment of new versions of workload, application, or service across multiple clusters is provided. The system includes a memory unit that stores a database and a set of instructions and a processor that executes the set of instructions. The processor is configured to create a tenant in a cloud using a user metadata received from a plurality of user devices. The tenant is created when an application installation is initiated in the plurality of user devices. The processor is configured to generate a tenant key based on tenant information and tenant metadata. The tenant metadata is created using tags comprising region, workload cluster information of database cluster including a cluster of database servers and compute cluster including a cluster of devices running high-performance computing applications, free snapshots including the region and the database cluster. The tenant metadata is created by associating the tags with resources within the database cluster. The created tenant metadata is stored in a tenant database. The processor is configured to map a snapshot of the tenant database including the tenant metadata to the tenant key. The processor is configured to create a Domain Name System record that maps a URL to an IP address of the plurality of user devices. The processor is configured to upload a license and generate a Key Management Service key simultaneously. The processor is configured to enable the controlled and staged deployment of the new versions of the workload, application, or service across multiple clusters by creating admin credentials for the tenant.

In an embodiment, the system is configured to install the application in the plurality of user devices by obtaining the user metadata using a distributed publish-subscribe messaging system. The application installation in the plurality of user devices is facilitated through gateway, web and plugins.

In another embodiment, the system is configured to map the tenant by (i) binding the tenant database with the workload cluster, (ii) publishing the tenant information, and (iii) pushing the published tenant information to the plurality of user devices.

In yet another embodiment, the tenant information includes tenant description, tenant contact information, tenant permissions and tenant usage.

In yet another embodiment, the system is configured to perform mutual TLS authentication when the Domain Name System record creation is failed.

In yet another embodiment, the system is configured to perform off-boarding of the tenant by (i) removing the tenant mapping, (ii) removing the tenant database from a database archive stored in a web-based cloud storage service (S3), (iii) deactivating the Key Management Service key, and (iv) sending a notification to the plurality of user devices.

In yet another embodiment, the system is configured to perform tenant upgrading during a trial period by (i) updating the tenant information, (ii) creating an updated tenant metadata, (iii) obtaining the compute cluster information, (iv) perform tenant mapping using the compute cluster information, (v) upgrading the license and (vi) sending the notification to the plurality of user devices.

In yet another embodiment, the system is configured to perform the tenant upgrading after trial period with data retention by (i) updating the tenant information obtained from the archive, (ii) restoring tenant database with the updated information, (iii) obtaining the compute cluster information, (iv) performing the tenant mapping using the compute cluster information, (v) upgrading the license and (vi) sending the notification to the plurality of user devices.

In yet another embodiment, the system is configured to perform the tenant upgrading after the trial period with data retention expiry by (i) updating the tenant information obtained from the archive, (ii) performing encryption of the tenant information, (iii) obtaining the compute cluster information, (iv) perform tenant mapping using the compute cluster information, (v) upgrading the license and generating Key Management Service key simultaneously, (vi) creating admin credentials for the tenant, and (vii) sending the notification to the plurality of user devices.

In yet another embodiment, the system is configured to perform database restoration for single tenant to multi-tenancy platform migration by (i) obtaining the database cluster and the computer cluster information, (ii) running of migration workflow using the cluster information and free snapshot ID (iii) mounting database from S3 and restoring the tenant database, (iiv) perform the tenant mapping using the database cluster and the computer cluster information, and (iv) upgrading the license.

In yet another embodiment, the system is configured to perform the tenant provisioning for single tenant to multi-tenancy platform migration by (i) creating the tenant and obtaining the tenant metadata, (ii) obtaining the compute cluster information, (iii) performing the tenant mapping using the compute cluster information, (iv) creating the Domain Name System record, wherein the Domain Name System record maps a URL to an IP address of the plurality of user devices, (v) resetting of the admin credentials, and (vi) encrypting the admin credentials.

In yet another embodiment, the system is configured to perform the tenant cluster movement within compute cluster by (i) updating the compute cluster information and triggering the cluster movement, (iii) performing the tenant mapping using the compute cluster information, (iv) remapping the Domain Name System record, and (v) sending the notification to the plurality of user devices.

In yet another embodiment, the system is configured to perform the tenant cluster movement within database cluster by (i) updating the database cluster information and triggering the cluster movement, (iii) obtaining tenant dump and restoring database dump in the database cluster, (iv) performing the tenant mapping using the updated database cluster information, and (v) sending the notification to the plurality of user devices.

In yet another embodiment, the system is configured to perform the tenant trial extension by (i) obtaining the compute cluster information and generating the license, (ii) activating the license, and (iii) sending the notification to the plurality of user devices.

In yet another embodiment, the system is configured to perform the tenant deletion by (i) obtaining the compute cluster information, (ii) deleting the tenant mapping using the compute cluster information, (iii) removing topics and Domain Name System entry record, and (iv) sending the notification to the plurality of user devices.

In yet another embodiment, the system is configured to perform licensed tenant upgrade by (i) updating the tenant information and triggering the upgrade, (ii) performing the tenant mapping using the compute cluster information, (iii) upgrading the license, and (iv) sending the notification to the plurality of user devices.

According to the second aspect of the invention, a method for performing tenant provisioning to enable controlled and staged deployment of new versions of workload, application, or service across the multiple clusters is provided. The method includes creating a tenant in a cloud using a user metadata received from a plurality of user devices. The tenant is created when an application installation is initiated in the plurality of user devices. The method includes generating a tenant key based on tenant information and tenant metadata. The tenant metadata is created using tags comprising region, workload cluster information of database cluster including a cluster of a database servers and compute cluster including a cluster of a devices running high-performance computing applications, free snapshots comprising the region and the database cluster. The tenant metadata is stored in a tenant database. The method includes mapping a snapshot of the tenant database including the tenant metadata to the tenant key. The method includes creating a Domain Name System record. The Domain Name System record maps a URL to an IP address of the plurality of user devices. The method includes uploading a license and generating a Key Management Service key simultaneously. The method includes enabling the controlled and staged deployment of the new versions of the workload, application, or service across multiple clusters by creating admin credentials for the tenant.

In an embodiment, the method includes installing the application in the plurality of user devices by obtaining the user metadata using a distributed publish-subscribe messaging system. The application installation in the plurality of user devices is facilitated through gateway, web and plugins.

In another embodiment, the method includes mapping the tenant by (i) binding the tenant database with the workload cluster, (ii) publishing the tenant information, and (iii) pushing the published tenant information to the plurality of user devices.

In yet another embodiment, the tenant information includes tenant description, tenant contact information, tenant permissions and tenant usage.

In yet another embodiment, the method includes performing mutual TLS authentication when the Domain Name System record creation is failed.

In yet another embodiment, the method includes performing off-boarding of the tenant by (i) removing the tenant mapping, (ii) removing the tenant database from a database archive stored in a web-based cloud storage service (S3), (iii) deactivating the Key Management Service key, and (iv) sending a notification to the plurality of user devices.

In yet another embodiment, the method includes performing tenant upgrading during a trial period by (i) updating the tenant information, (ii) creating an updated tenant metadata, (iii) obtaining the compute cluster information, (iv) perform tenant mapping using the compute cluster information, (v) upgrading the license and (vi) sending the notification to the plurality of user devices.

In yet another embodiment, the method includes performing the tenant upgrading after trial period with data retention by (i) updating the tenant information obtained from the archive, (ii) restoring tenant database with the updated information, (iii) obtaining the compute cluster information, (iv) performing the tenant mapping using the compute cluster information, (v) upgrading the license and (vi) sending the notification to the plurality of user devices.

In yet another embodiment, the method includes performing the tenant upgrading after the trial period with data retention expiry by (i) updating the tenant information obtained from the archive, (ii) performing encryption of the tenant information, (iii) obtaining the compute cluster information, (iv) perform tenant mapping using the compute cluster information, (v) upgrading the license and generating Key Management Service key simultaneously, (vi) creating admin credentials for the tenant, and (vii) sending the notification to the plurality of user devices.

In yet another embodiment, the method includes performing database restoration for single tenant to multi-tenancy platform migration by (i) obtaining the database cluster and the computer cluster information, (ii) running of migration workflow using the cluster information and free snapshot ID (iii) mounting database from S3 and restoring the tenant database, (iiv) perform the tenant mapping using the database cluster and the computer cluster information, and (iv) upgrading the license.

In yet another embodiment, the method includes performing the tenant provisioning for single tenant to multi-tenancy platform migration by (i) creating the tenant and obtaining the tenant metadata, (ii) obtaining the compute cluster information, (iii) performing the tenant mapping using the compute cluster information, (iv) creating the Domain Name System record that maps a URL to an IP address of the plurality of user devices, (v) resetting of the admin credentials, and (vi) encrypting the admin credentials.

In yet another embodiment, the method includes performing the tenant cluster movement within compute cluster by (i) updating the compute cluster information and triggering the cluster movement, (iii) performing the tenant mapping using the compute cluster information, (iv) remapping the Domain Name System record, and (v) sending the notification to the plurality of user devices.

In yet another embodiment, method including performing the tenant cluster movement within database cluster by (i) updating the database cluster information and triggering the cluster movement, (iii) obtaining tenant dump and restoring database dump in the database cluster, (iv) performing the tenant mapping using the updated database cluster information, and (v) sending the notification to the plurality of user devices.

In yet another embodiment, the method includes performing the tenant trial extension by (i) obtaining the compute cluster information and generating the license, (ii) activating the license, and (iii) sending the notification to the plurality of user devices.

In yet another embodiment, the method includes performing the tenant deletion by (i) obtaining the compute cluster information, (ii) deleting the tenant mapping using the compute cluster information, (iii) removing topics and Domain Name System entry record, and (iv) sending the notification to the plurality of user devices.

In yet another embodiment, the method includes performing licensed tenant upgrade by (i) updating the tenant information and triggering the upgrade, (ii) performing the tenant mapping using the compute cluster information, (iii) upgrading the license, and (iv) sending the notification to the plurality of user devices.

According to the third aspect of the present invention, one or more non-transitory computer-readable storage mediums storing the one or more sequences of instructions, which when executed by the one or more processors, causes to perform a method for performing tenant provisioning to enabling controlled and staged deployment of new versions of workload, application, or service across the multiple clusters by (a) creating a tenant in a cloud using a user metadata received from a plurality of user devices, the tenant is created when an application installation is initiated in the plurality of user devices, (b) generating a tenant key based on tenant information and tenant metadata, the tenant metadata is created using tags comprising region, workload cluster information of database cluster including a cluster of database servers and compute cluster including a cluster of devices running high-performance computing applications, free snapshots comprising the region and the database cluster, the tenant metadata is stored in a tenant database, (c) mapping a snapshot of the tenant database including the tenant metadata to the tenant key, (d) creating a Domain Name System record that maps a URL to an IP address of the plurality of user devices, (e) uploading a license and generating a Key Management Service key simultaneously, and (f) enabling controlled and staged deployment of new versions of workload, application, or service across the multiple clusters by creating admin credentials for the tenant.

BRIEF DESCRIPTION OF THE DRAWINGS

The embodiments herein will be better understood from the following detailed description with reference to the drawings, in which:

FIG. 5 illustrates a sequence diagram for tenant-off boarding of the system of FIG. 1 according to some embodiments herein;

FIG. 6 illustrates a sequence diagram for tenant upgrade during a free trial of the system of FIG. 1 according to some embodiments herein;

DETAILED DESCRIPTION OF PREFERRED EMBODIMENTS

Figure 1:
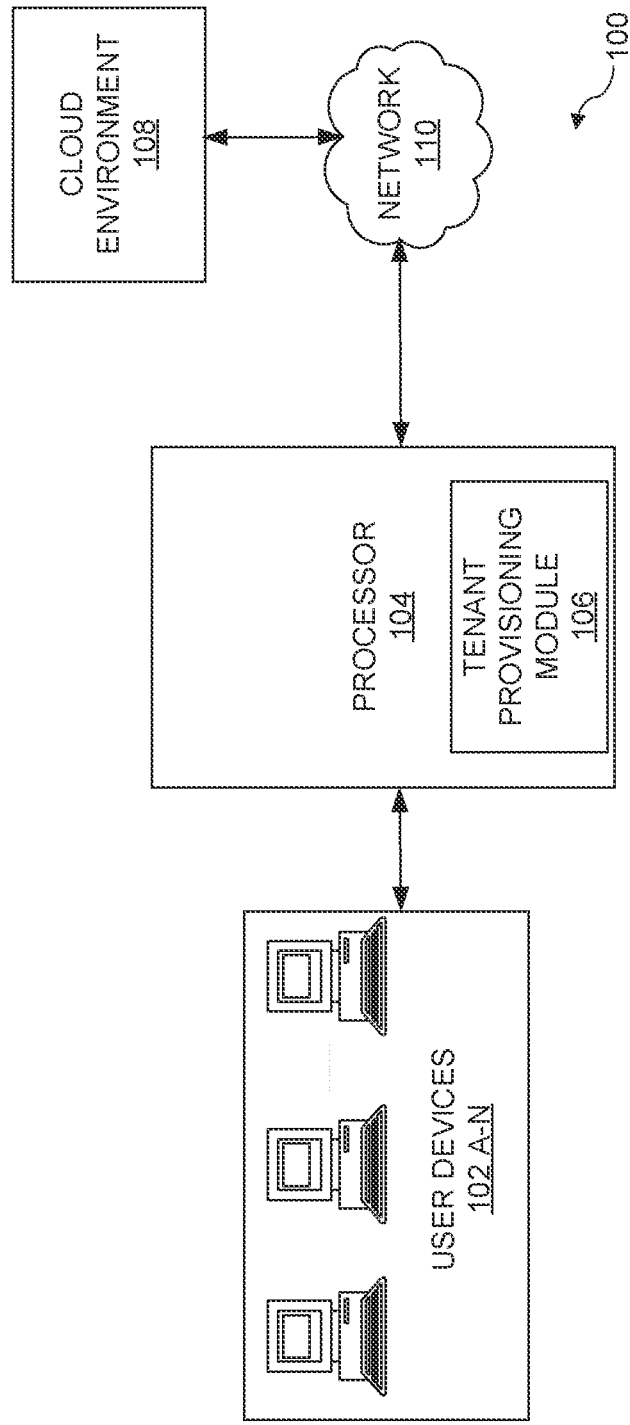
FIG. 1 is block diagram that illustrates a system for performing tenant provisioning to enable controlled and staged deployment of new versions of workload, application, or service across multiple clusters according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a cloud orchestration system for SaaS Multi-tenancy capabilities with a reliable level of efficiency and security. The present invention provides a system and method that performs tenant provisioning to enable controlled and staged deployment of new versions of workload, application, or service across the multiple clusters. Referring now to the drawings, and more particularly to FIGS. 1 through 20, where similar reference characters denote corresponding features consistently throughout the figures, there are shown preferred embodiments.

FIG. 1 is block diagram that illustrates a system 100 for performing tenant provisioning to enable controlled and staged deployment of new versions of workload, application, or service across multiple clusters according to some embodiments herein. The system 100 includes user devices 102A-N, a processor 104 that includes a tenant provisioning module 106, a cloud environment 108 and a network 110. The tenant provisioning module 106 performs Cluster Provisioning, Tenant Management and Canary Upgrade of Workload across clusters. The system 100 conveys single view capabilities to manage the cluster, tenant and upgrade of application workloads. In some embodiments, the tenant provisioning module 106 is implemented for EKS—Elastic Kubernetes Service (AWS—Amazon Web Services), GKE—Google Kubernetes Engine, AKS—Azure Kubernetes Service managed services. The tenant provisioning module 106 performs the following functions of creating template schema, assigning schema to tenant, performing application upgrades, performing license management, and performing backup provisioning. The system 100 facilitates monitoring of actions by providing a consolidated log view, cluster log view, tenant log view and metrics view. A provisioning cluster control plane component of the tenant provisioning module 106 includes a control plane for performing functions and processes that determine which path to use to send the packet or frame. The control plane includes provisioning, off-boarding, License upgrade, plugin/DB upgrade, cluster installation and cluster movement. The provisioning cluster control plane component includes a data plane including a compute cluster and a database cluster for performing functions.

The software as a service (SaaS) Workflow for the deployment and management of Multi-tenancy components of the system 100 includes installing an application in a user device 102A by obtaining data using a distributed publish-subscribe messaging system (i.e.) kafka, Istio, Redis from disparate source systems through infra \ components and the data is made available to target systems in real-time. In some embodiments, the application installation is facilitated through gateway, web and plugins. In some embodiments, Application provisioning includes Tenant provisioning which is performed by (i) mapping snapshot DB to a tenant key, (ii) updating Redis cache with tenant mapping, (iii) creating DNS (Domain Name System) entry, (iv) uploading license, (v) creating admin credentials for the tenant, and (vi) sending a welcome email. Application provisioning includes tenant migration which includes migrating tenants across tenants. The tenant provisioning module 106 may use Visual Workflow to perform tenant-related activities. The workload cluster is not tied to one dedicated DB Cluster. This allows the flexibility of having multiple DB Clusters associated with a single Workload cluster. For example, Redis will act as a local datastore to persist any metadata that is required for the workload cluster to operate. Since Redis has become more than a simple cache layer, High Availability of Redis must be ensured.

The system 100 for performing tenant provisioning to enable controlled and staged deployment of new versions of workload, application, or service across multiple clusters is provided. The system 100 includes a memory unit that stores a database and a set of instructions and the processor 104 that executes the set of instructions. The processor 104 is configured to create a tenant in a cloud using a user metadata received from a plurality of user devices 102A-N. The tenant is created when an application installation is initiated in the plurality of user devices 102A-N. The processor 104 is configured to generate a tenant key based on tenant information and tenant metadata. The tenant metadata is created using tags comprising region, workload cluster information of database cluster including a cluster of database servers and compute cluster including a cluster of devices running high-performance computing applications, free snapshots including the region and the database cluster. The tenant metadata is created by associating the tags with resources within the database cluster. The created tenant metadata is stored in a tenant database. The processor 104 is configured to map a snapshot of the tenant database including the tenant metadata to the tenant key. The processor 104 is configured to create a Domain Name System record that maps a URL to an IP address of the plurality of user devices 102A-N. The processor 104 is configured to upload a license and generate a Key Management Service key simultaneously. The processor 104 is configured to enable the controlled and staged deployment of the new versions of the workload, application, or service across multiple clusters by creating admin credentials for the tenant.

Figure 2:
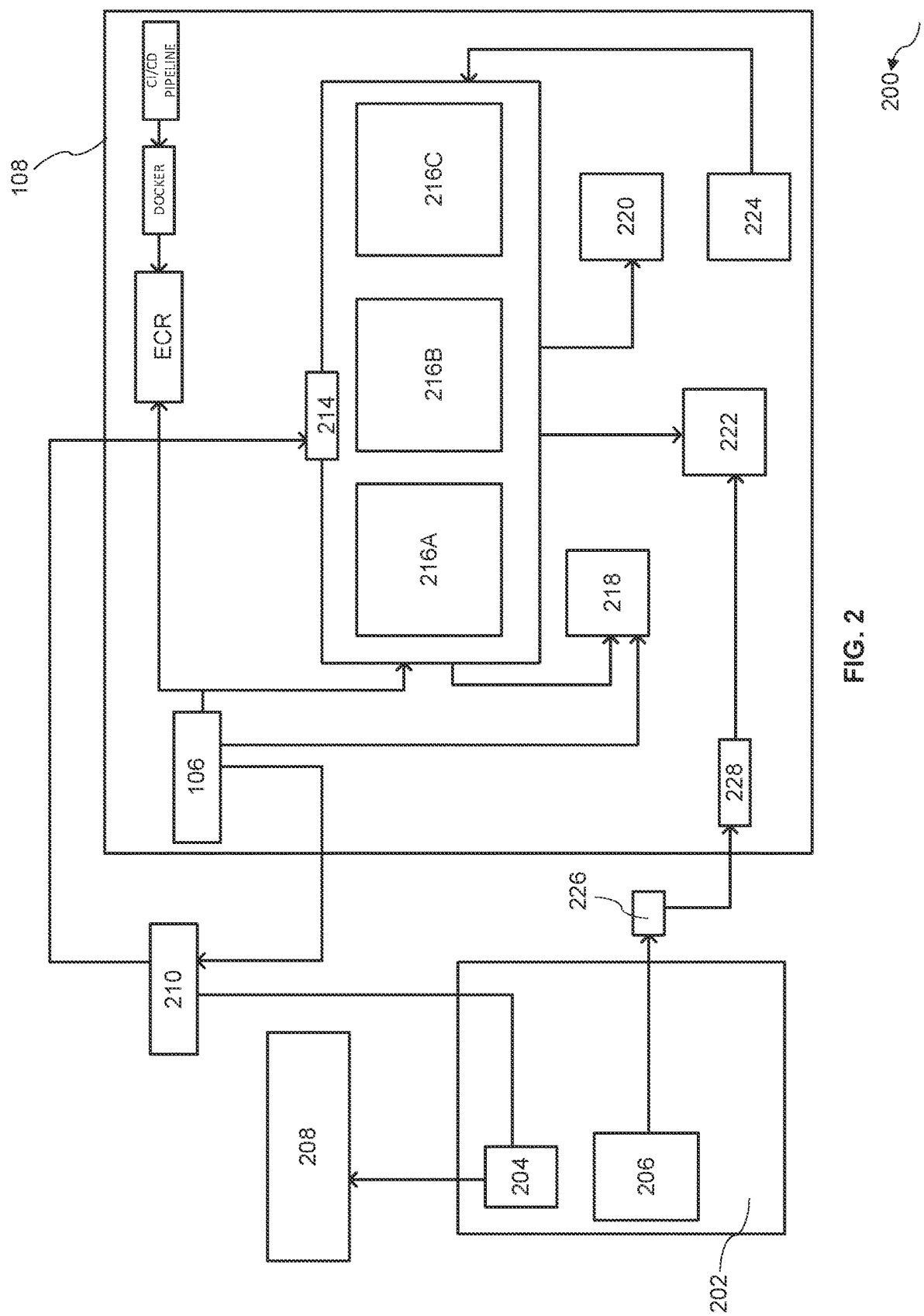
FIG. 2 illustrates a network architecture diagram of the system of FIG. 1 according to some embodiments herein.

FIG. 2 illustrates a network architecture diagram 200 of the system 100 of FIG. 1 according to some embodiments herein. The network architecture diagram 200 of the system 100 includes a tenant premise 202, a website 208, an URL 210, the tenant provisioning module 106, the cloud environment 108, a cloud load balancer 214, availability zones 216A-C, a cloud database 218, a managed Kubernetes service 220, an event streaming platform 222, a Bastion host 224, a network 226 and a network load balancer 228. The tenant premise 202 includes the user devices 102A-N and a cloud connector 206 to establish a secure connection with the cloud environment 108 through the network 226. The network 226 may be an internet. The user signs up in the website 208 and a tenant is created using user metadata by a tenant module. The cloud load balancer 214 distributing workloads across the availability zones 216A-C to increase the availability of the application. Setup of the managed Kubernetes service 220, for example, Elastic Kubernetes Service (EKS) setup is performed using a Cloud Formation template which is a JSON-formatted text file. The event streaming platform 222, for example kafka receives data from disparate source systems and makes the data available to target systems in real-time. The network load balancer 228 preserves the client side source IP allowing the back-end to see the IP address of the client. A Bastion host is used in the cloud environment 108 as a server to provide access to a private network from an external network such as the Internet.

Figure 3:
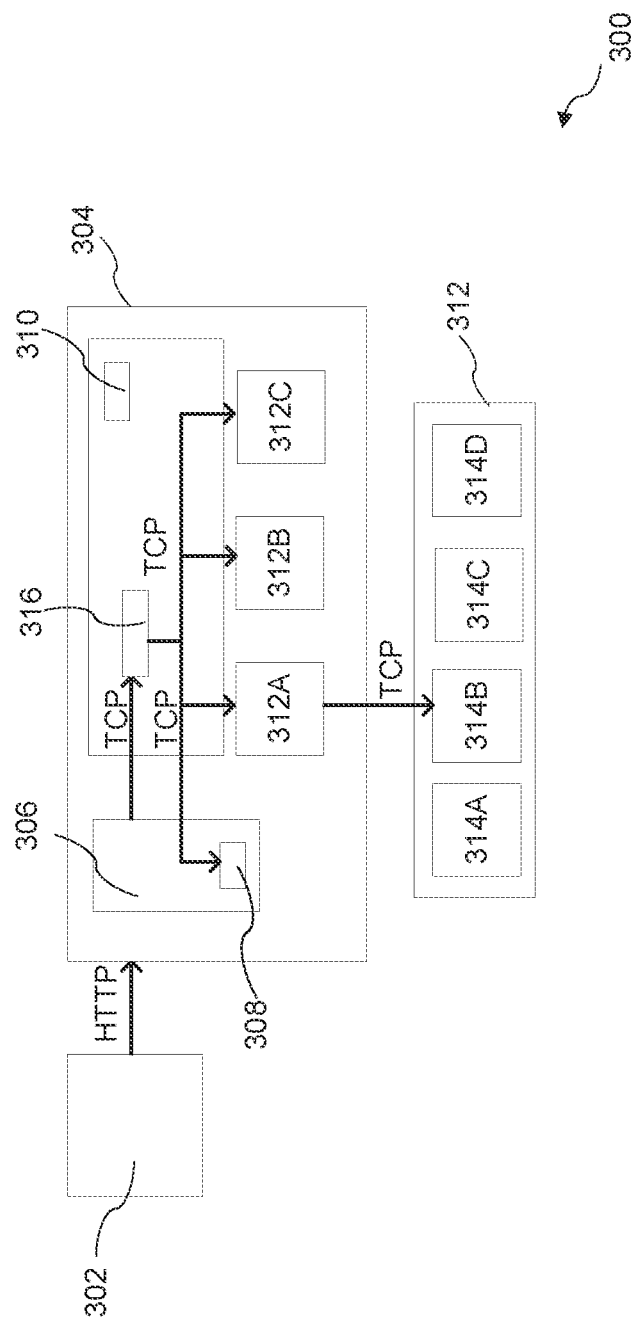
FIG. 3 illustrates a block diagram for tenant mapping of the system of FIG. 1 according to some embodiments herein.

FIG. 3 illustrates a block diagram 300 for tenant mapping of the system 100 of FIG. 1 according to some embodiments herein. The block diagram 300 includes a provisioning cluster 302, a compute cluster 304 and a database cluster 312. The compute cluster 304 includes a common module storing a tenant info cache 308. The tenant information is stored in temporary storage in a Remote Dictionary Server 310. The tenant information is transmitted through a tenant information channel 316 using a Transmission Control Protocol (TCP) which establishes reliable communication between two computers in a network and ensures that the data is received correctly in the right order. The database cluster 312 includes unbound and tenant database. The tenant information is stored in a new tenant database 314B in the database cluster 312 including one or more tenant databases 314A-D through the transmission control protocol (TCP).

Figure 4A:
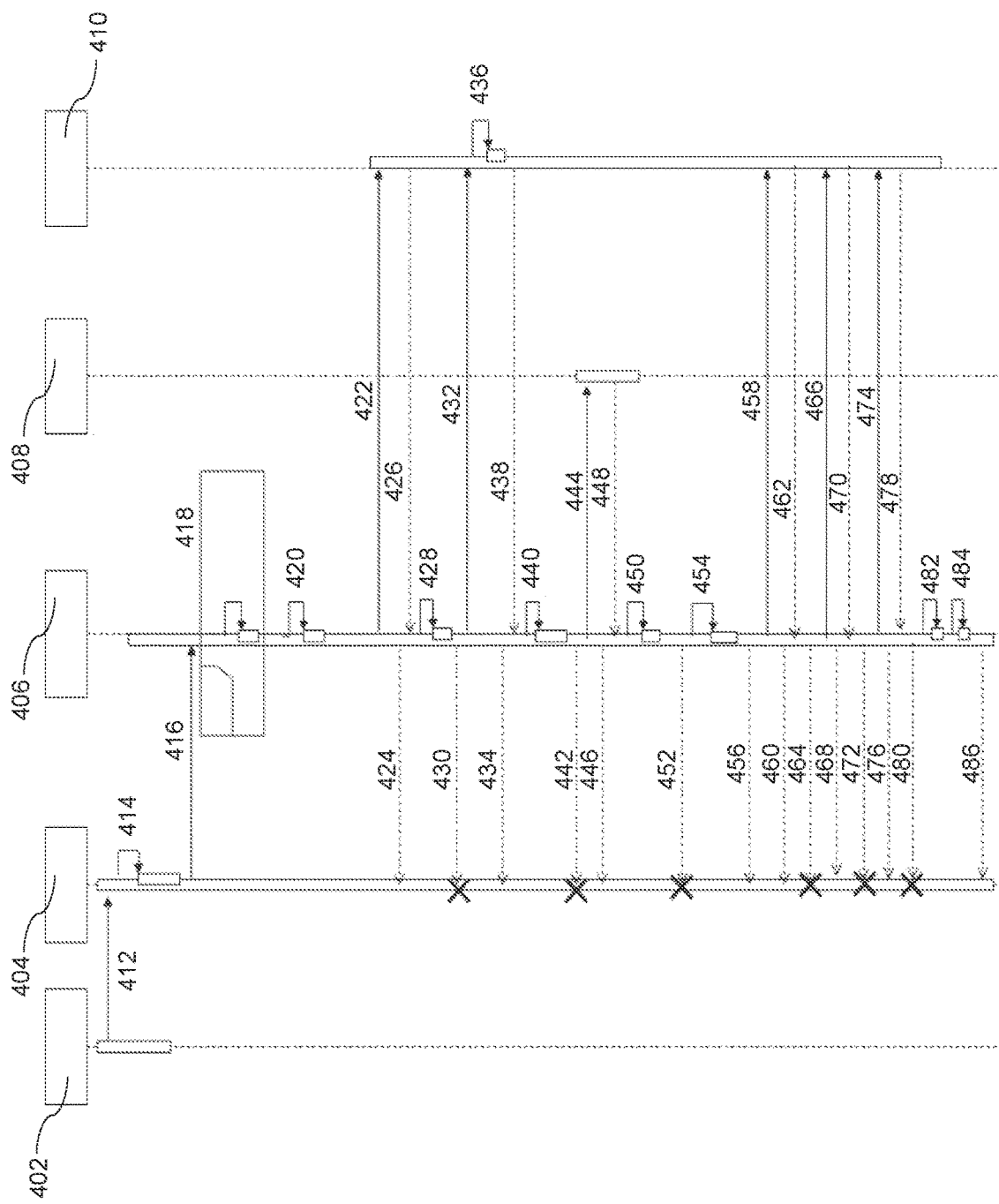
FIG. 4A illustrates a sequence diagram of tenant provisioning of the system of FIG. 1 according to some embodiments herein.

FIG. 4A illustrates a sequence diagram of tenant provisioning of the system 100 of FIG. 1 according to some embodiments herein. The sequence diagram includes a signup page 402, a tenant module 404, a visual workflow 406, a web service 408, and a compute cluster 410. At a step 412, a tenant is created. At a step 414, tenant metadata is created. At a step 416, provisioning is triggered. At a step 418, approval process is performed. The approval process may be optional. At a step 420, cluster information is obtained. At a step 422, a tenant is mapped and a status update is sent at a step 424. On failure of tenant mapping at a step 426, re-triggering is performed at a step 428. On failure tenant mapping at a step 430, the tenant mapping action is terminated. At a step 432, license provisioning is performed and a status update is sent at a step 434. At a step 436, KMS Key is generated. On failure of license provisioning at a step 438, re-triggering is performed at a step 440. On failure of license provisioning at a step 442, the license provisioning action is terminated. At a step 444, DNS entry is created and a status update is sent at a step 446. On failure of DNS entry creation at a step 448, re-triggering is performed at a step 450. On failure of DNS entry creation after re-triggering at a step 452, the DNS entry creation action is terminated.

At a step 454, MTLS (Mutual TLS authentication) is generated and status update is sent at a step 456. At a step 458, sanity check is triggered and status update is sent at a step 460. On failure of sanity check at a step 462 the sanity check action is terminated at a step 464. At a step 466, username and password is generated and a status update is sent at a step 468. On failure of username and password generation at a step 470, the username and password generation is terminated at a step 472. At a step 474, admin password reset is performed and a status update is sent at a step 476. On failure of admin password reset at a step 478, the admin password reset action is terminated at a step 480. At a step 482, store admin password is encrypted. At a step 484, email is sent. At a step 486, status update regarding encrypted store admin password and the email communication is sent. The tenant is created using tenant metadata by the tenant module 404. The tenant waits for provisioning approval. The tenant mapping is performed when the provisioning is approved. A license key is generated. A Domain Name System (DNS) record maps a URL to an IP address using DNS provisioning and KMS (Key Management Service) key generation. A sanity check is performed and a username and password are generated. A notification is sent after the generation of the username and password. HTTP protocols are used as part of the provisioning cluster module for API-related communication across compute clusters. On failure of an action, retriggering is performed at least three times and a status update is sent upon completing an action. The KMS key generation for individual tenants will be done as part of license provisioning and will not be a separate step. For tenant provisioning, the license upload and KMS key generation will be done as a single step.

Figure 4B:
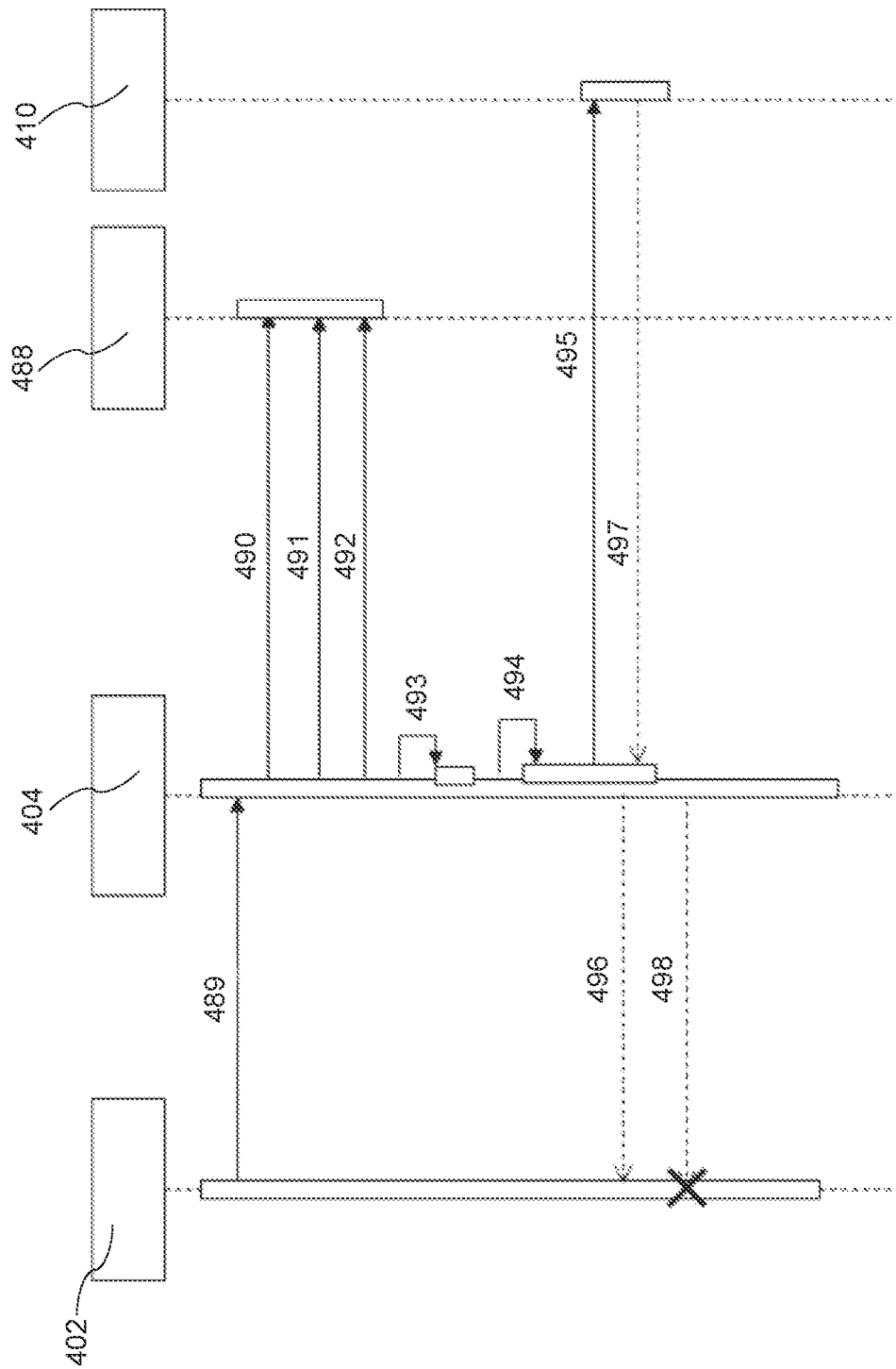
FIG. 4B illustrates a sequence diagram of a creation of tenant metadata for tenant provisioning of the system of FIG. 1 according to some embodiments herein.

FIG. 4B illustrates a sequence diagram of a creation of tenant metadata for tenant provisioning of the system 100 of FIG. 1 according to some embodiments herein. The sequence diagram includes the signup page 402, the tenant module 404, a Database 488, and the compute cluster 410. At a step 489 tenant signs up. At a step 490, Tags (region) is obtained. At a step 491, cluster details (tags) are obtained. At a step 492, free snapshot (region, dbcluster) is obtained. At a step 493, computer cluster using round robin is chosen. At a step 494, workflow is triggered. At a step 495, provisioning is triggered and a status update is sent at a step 496. On failure of triggering provisioning at a step 497, the triggering of provisioning action is terminated at a step 498. After the tenant signs up, tags (region), cluster details (tags), free snapshots (region, DB cluster) are obtained. Tenant provisioning is triggered. A status update is sent upon completing an action.

FIG. 5 illustrates a sequence diagram for tenant-off boarding of the system 100 of FIG. 1 according to some embodiments herein. The sequence diagram includes a signup page 502, a tenant module 504, a visual workflow 506, a web service 508, and a compute cluster 510. At a step 512, off-boarding of tenant is triggered. At a step 514, approval process is performed. The approval process may be optional. At a step 516, cluster information is obtained. At a step 518, tenant mapping is removed and a status update is sent at a step 520. On failure of removal of tenant mapping at a step 522, re-triggering is performed at a step 524. On failure of removal of tenant mapping after re-triggering at a step 526 the tenant mapping removal action is terminated. At a step 528, dbArchive is performed and a status update is sent at a step 530. On failure of db archiving at a step 532, re-triggering is performed at a step 534. On failure of db archiving after re-triggering at a step 536, the db archiving action is terminated. At a step 538, storeArchive to S3 is performed and a status update is performed at a step 540. On failure on storeArchive to S3, the action is terminated at a step 542. At a step 544, tenant database is removed and a status update is sent at a step 546. On failure of tenant database removal at a step 548, re-triggering is performed at a step 550. On failure of tenant database removal after re-triggering at a step 552, the tenant database removal action is terminated. At a step 554, an email is sent and a status update regarding the email communication is sent at a step 556. Off-boarding of a tenant is initiated by the tenant module 504. The tenant map is removed on receiving approval for the tenant off-boarding and the tenant database is removed from a database archive. An archive is stored in a web-based cloud storage service (S3). A KMS (Key Management Service) key is deactivated and a notification is sent. TCP protocol is used for DB-related communication across DB clusters. On failure of an action, retriggering is performed at least three times and a status update is sent upon completing an action.

FIG. 6 illustrates a sequence diagram for tenant upgrade during a free trial of the system 100 of FIG. 1 according to some embodiments herein. The sequence diagram includes a tenant module 602, a visual workflow 604, and a compute cluster 606. At a step 608, tenant information is updated. At a step 610, upgrade is triggered. At a step 612, approval process is performed. The approval process may be optional.

At a step 614, cluster information is obtained. At a step 616, tenant mapping is performed and a status update is sent at a step 618. On failure of tenant mapping at a step 620, re-triggering is performed at a step 622. On failure of tenant mapping after re-triggering at a step 624 the tenant mapping action is terminated. At a step 626, License upgrade is performed and a status update is sent at a step 628. On failure of License upgrade at a step 630, re-triggering is performed at a step 632. On failure of License upgrade after re-triggering at a step 634, the License upgrade action is terminated. At a step 636, an email is sent and a status update regarding the email communication is sent at a step 638. The tenant information is updated by the tenant module 602. The update is triggered. If the update is approved, the cluster information is obtained to perform tenant mapping. The license is also upgraded. On failure of an action, retriggering is performed at least three times and a status update is upon completing an action.

Figure 7:
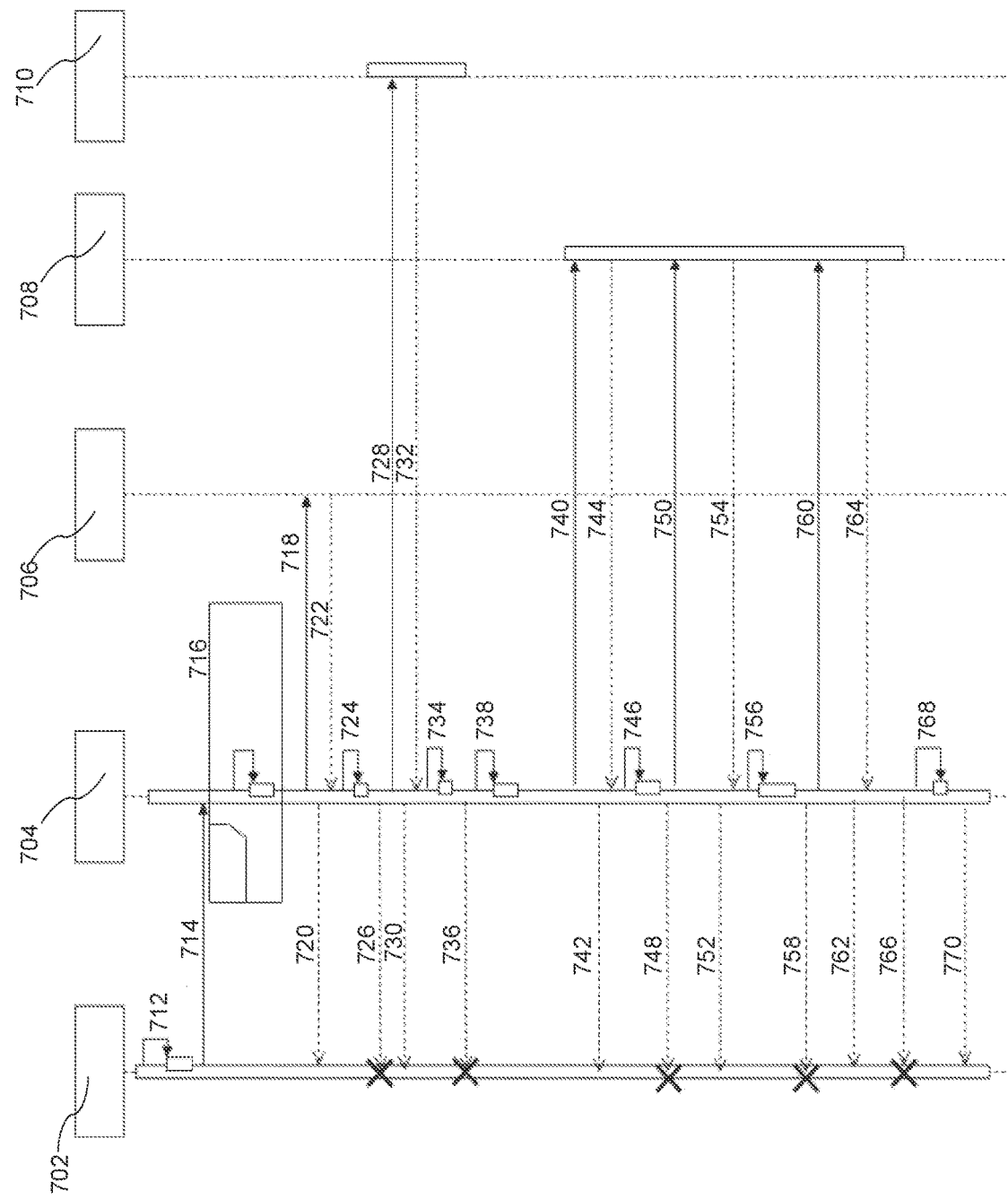
FIG. 7 illustrates a sequence diagram of tenant upgrade after a trial period within data retention of the system of FIG. 1 according to some embodiments herein.

FIG. 7 illustrates a sequence diagram of tenant upgrade after a trial period within data retention of the system 100 of FIG. 1 according to some embodiments herein. The sequence diagram includes a tenant module 702, a visual workflow 704, a web service 706, a compute cluster 708 and a DB cluster 710. At a step 712, tenant information is updated. At a step 714, upgrade is triggered. At a step 716, approval process is performed. The approval process may be optional. At a step 718, download from Archive is performed and a status update is sent at a step 720. On failure of downloading from Archive at a step 722, re-triggering is performed at a step 724. On failure of downloading from Archive after re-triggering at a step 726, the download from archive action is terminated. At a step 728, restoring tenantDB is performed and a status update is sent at a step 730. On failure of restoring tenantDB at a step 732, re-triggering is performed at a step 734. On failure of restoring tenantDB after re-triggering at a step 736, the restoring tenantDB action is terminated. At a step 738, cluster information is obtained. At a step 740, tenant mapping is performed and a status update is sent at a step 742. On failure of tenant mapping at a step 744, re-triggering is performed at a step 746. On failure of tenant mapping after re-triggering at a step 748, the tenant mapping action is terminated. At a step 750, License upgrade is performed and a status update is sent at a step 752. On failure of License upgrade at a step 754, re-triggering is performed at a step 756. On failure of License upgrade after re-triggering at a step 758, the License upgrade action is terminated. At a step 760, sanity check is triggered and status update is sent at a step 762. On failure of sanity check at a step 764, the sanity check action is terminated at a step 766. At a step 768, an email is sent and a status update regarding the email communication is sent at a step 770. The tenant information is updated by the tenant module 702. The update is triggered. The tenant database is downloaded from the archive and restored. If the update is approved, the cluster information is obtained to perform tenant mapping. The license is also upgraded and a sanity check is triggered. On failure of an action, retriggering is performed at least three times and a status update is sent upon completing an action.

Figure 8:
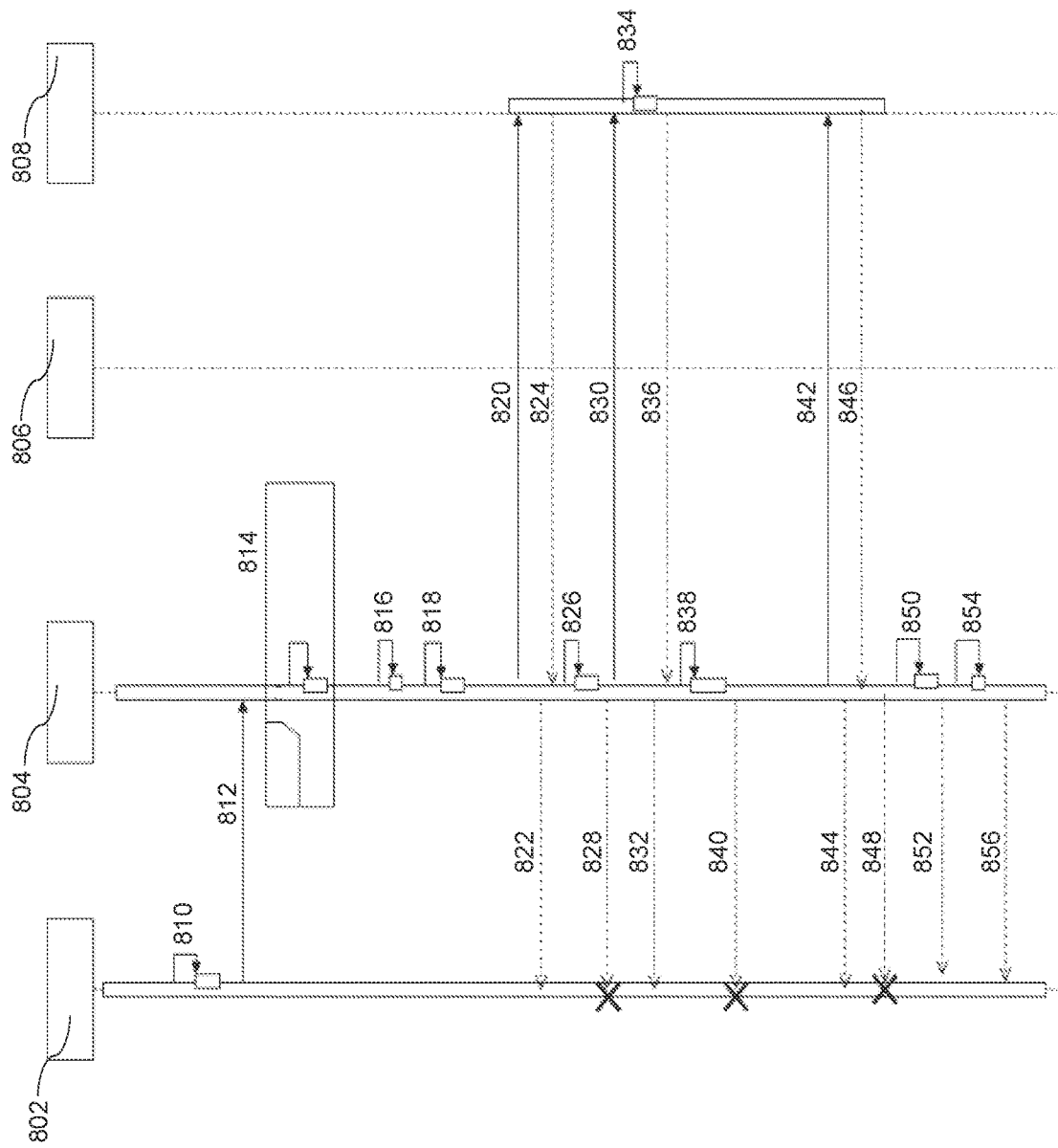
FIG. 8 illustrates a sequence diagram of a tenant upgrade after a trial period and data retention expiry of the system of FIG. 1 according to some embodiments herein.

FIG. 8 illustrates a sequence diagram of a tenant upgrade after a trial period and data retention expiry of the system 100 of FIG. 1 according to some embodiments herein. The sequence diagram includes a tenant module 802, a visual workflow 804, a web service 806, and a compute cluster 808. At a step 810, tenant information is updated. At a step 812, upgrade is triggered. At a step 814, approval process is performed. The approval process may be optional. At a step 816, data encryption is performed. At a step 818, cluster information is obtained. At a step 820, a tenant mapping is performed and a status update is sent at a step 822. On failure of tenant mapping at a step 824, re-triggering is performed at a step 826. On failure of tenant mapping after re-triggering, at a step 828 the tenant mapping action is terminated. At a step 830, license upgrading is performed and a status update is sent at a step 832. At a step 834, KMS Key is generated. On failure of license upgrading at a step 836, re-triggering is performed at step 838. On failure of license upgrading after re-triggering at a step 840, the license upgrading action is terminated. At a step 842, sanity check is triggered and status update is sent at a step 844. On failure of sanity check at a step 846, the sanity check action is terminated at a step 848. At a step 850, username and password is generated and a status update is sent at a step 852. At a step 854, an email is sent and a status update regarding email communication is sent at a step 856. The tenant information is updated by the tenant module 802. The update is triggered. The updated data is encrypted and cluster information is obtained. Tenant mapping is performed. The license is also upgraded and a sanity check is triggered. User name and password is generated. On failure of an action, retriggering is performed at least three times and a status update is sent upon completing an action.

Figure 9:
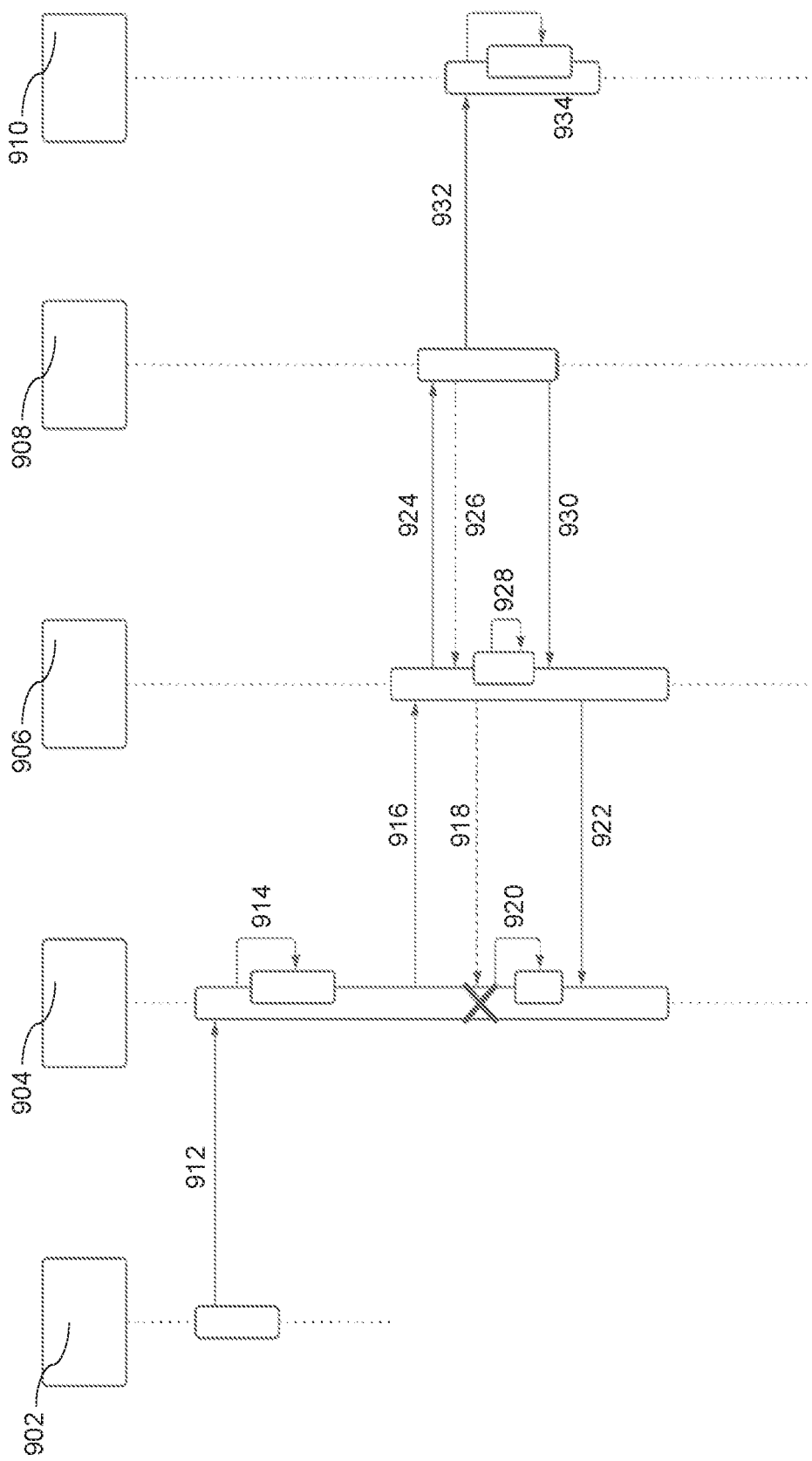
FIG. 9 illustrates a sequence diagram of a tenant mapping of the system of FIG. 1 according to some embodiments herein.

FIG. 9 illustrates a sequence diagram of a tenant mapping of the system 100 of FIG. 1 according to some embodiments herein. The sequence diagram includes a sign-up page 902, a provisioning cluster 904, a gateway 906, a Redis 908, and plugins 910. At a step 912, sign-up is performed. At a step 914, binding database and workload cluster to tenant is performed. At a step 916, propagating new tenant information is performed. If the new tenant information propagation is failed to update at a step 918, re-triggering is performed at a step 920. At a step 922, new tenant information propagation is successfully updated. At a step 924, tenant information is published. On failure of tenant information publishing at a step 926, re-entry is performed at a step 928. At a step 930, the tenant information is successfully published. At a step 932, pushing to subscribers is performed. At a step 934, tenant information cache is updated. After signup, binding of database and workload cluster to the tenant is performed. New tenant information is propagated and the tenant information is published and pushed to subscribers. The tenant info cache is successfully updated. On failure of an action, retriggering or re-entry is performed at least three times and a status update is sent upon completing an action.

Figure 10:
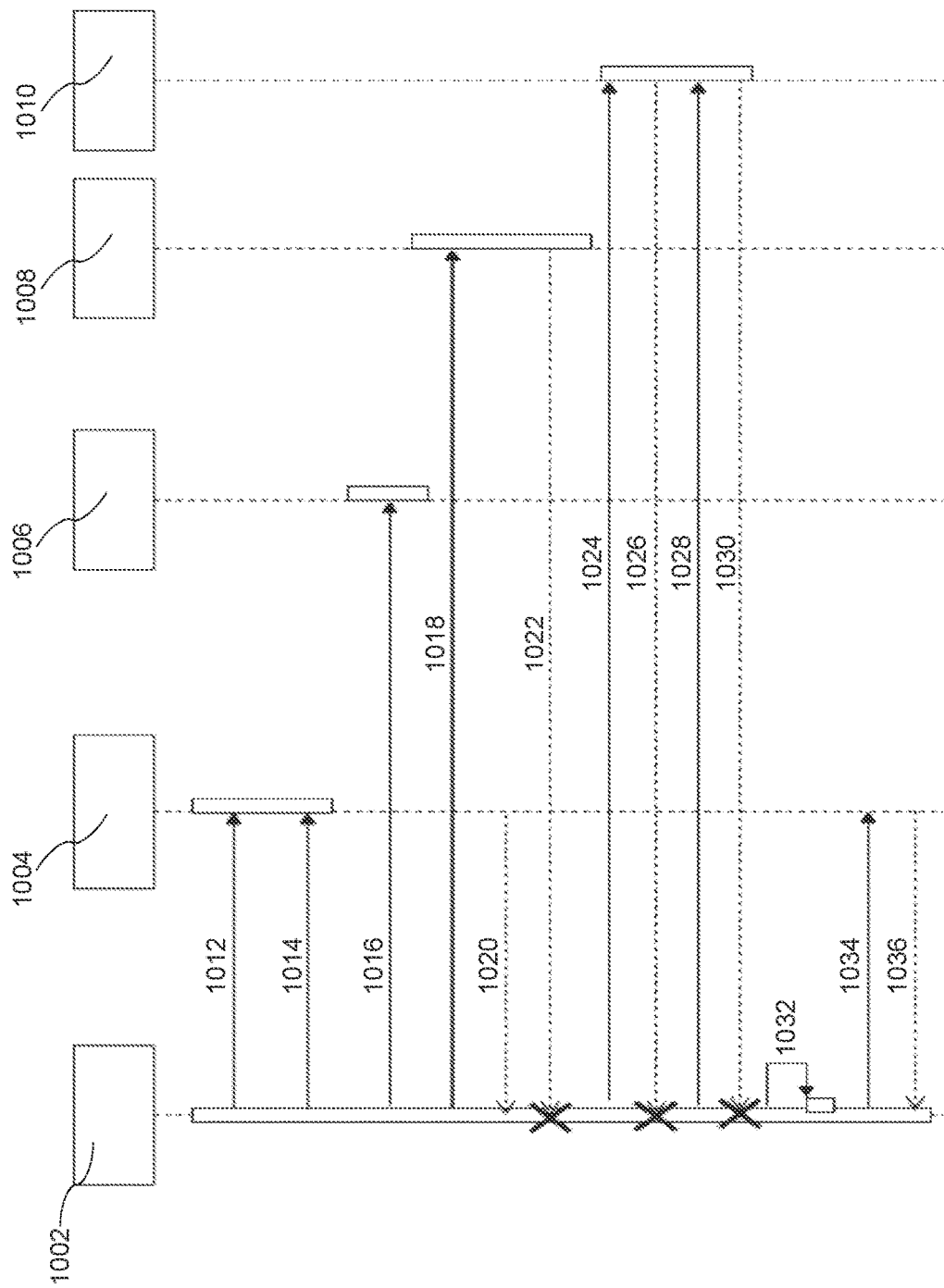
FIG. 10 illustrates a sequence diagram of a single tenant to multi-tenancy platform migration i.e. Database, DB restoration, of the system of FIG. 1 according to some embodiments herein.

FIG. 10 illustrates a sequence diagram of a single tenant to multi-tenancy platform migration i.e., Database, DB restoration, of the system 100 of FIG. 1 according to some embodiments herein. The sequence diagram includes a visual workflow 1002, a tenant module 1004, a web service 1006, a database cluster 1008, and a compute cluster 1010. At a step 1012, cluster details are obtained. At a step 1014, freesnapshotid are obtained. At a step 1016, mount DB from S3 is performed. At a step 1018, tenant DB is restored and a status update is sent at a step 1020. On failure of restoring tenant DB at a step 1022, the restoring tenant DB action is terminated. At a step 1024, tenant mapping is performed. On failure, the tenant mapping action is terminated at a step 1026. At a step 1028, license uploading is performed. On failure of license uploading at a step 1030 the action is terminated. At a step 1032, running of migration workflow is performed. At a step 1034, snapshot with tenantid is updated and a status update is sent at a step 1036. To run the migration workflow, cluster details and free snapshot id are obtained. Mounting database (DB) from S3 is performed. Tenant DB is restored which is followed by tenant mapping and license upload. The snapshot is updated with Tenant id and a status update is sent. A status update is also sent upon completion of an action.

Figure 11:
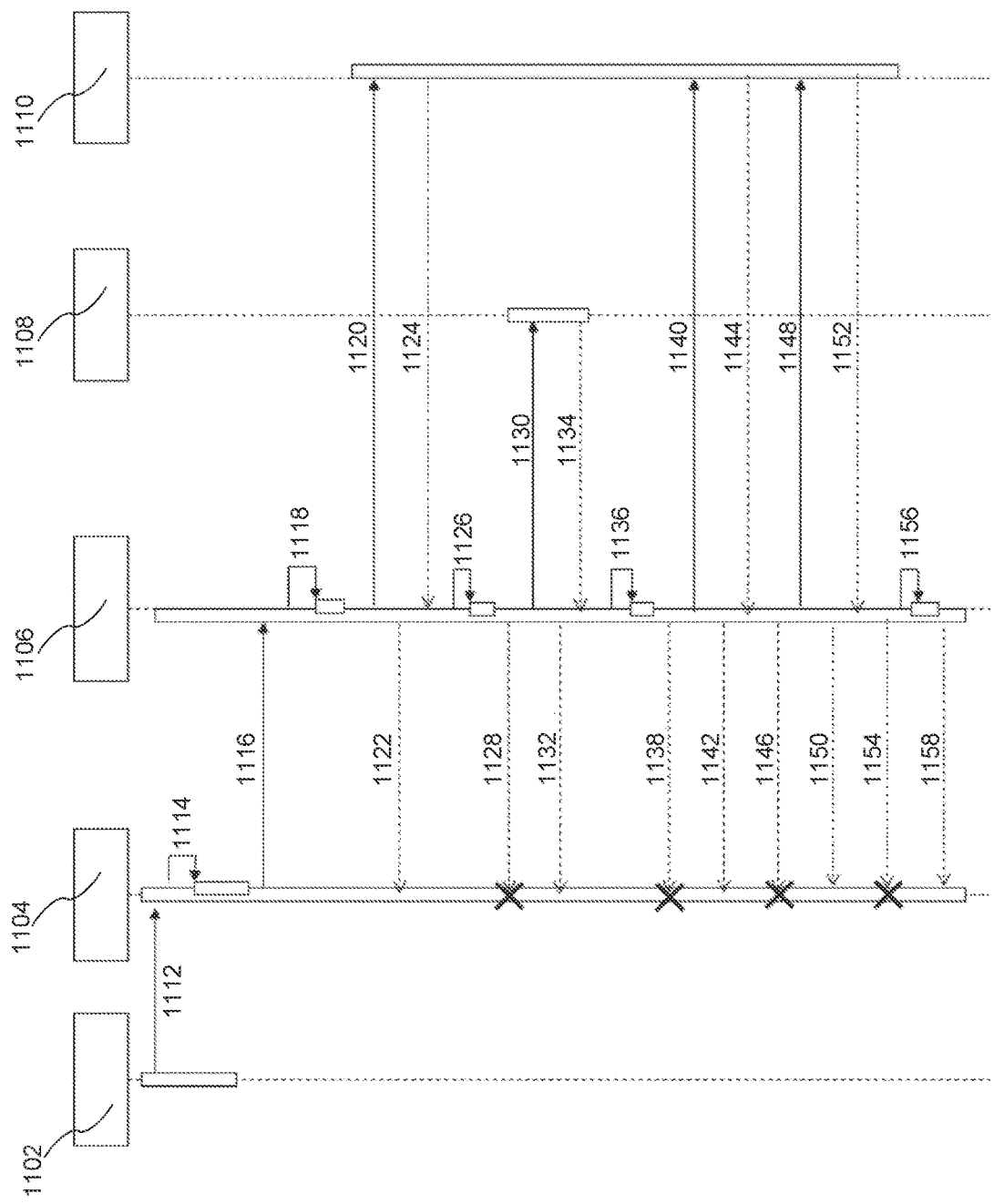
FIG. 11 illustrates a sequence diagram of a single tenant to multi-tenancy platform migration i.e. tenant provisioning, of the system of FIG. 1 according to some embodiments herein.

FIG. 11 illustrates a sequence diagram of a single tenant to multi-tenancy platform migration i.e. tenant provisioning, of the system 100 of FIG. 1 according to some embodiments herein. The sequence diagram includes a user interface 1102, a tenant module 1104, a visual workflow 1106, a cloudflare 1108, and a compute cluster 1110. At a step 1112, tenant is created. At a step 1114, tenant metadata is created. At a step 1116, provisioning is triggered. At a step 1118, cluster information is obtained. At a step 1120, tenant mapping is performed and a status update is sent at a step 1122. On failure of tenant mapping at a step 1124, re-triggering is performed at a step 1126. On failure of tenant mapping after re-triggering at a step 1128, the tenant mapping action is terminated. At a step 1130, DNS entry creation is performed and a status update is sent at a step 1132. On failure of DNS entry creation at a step 1134, re-triggering is performed at a step 1136. The DNS entry creation action is terminated at a step 1138 on failure after retriggering at a step 1136. At a step 1140, sanity check is triggered and status update is sent at a step 1142. On failure of sanity check at a step 1144, the sanity check action is terminated at a step 1146. At a step 1148, resetting admin password is performed and a status update is sent at a step 1150. On failure of resetting admin password at a step 1152, the resetting admin password action is terminated at a step 1154. At a step 1156, encryption of store admin password is performed and a status update is sent at a step 1158. The tenant is created using tenant metadata by the tenant module 1104. Tenant provisioning is triggered. Cluster information is obtained to perform tenant mapping. DNS entry is created and a sanity check is triggered. The admin password is reset and encrypted. On failure of an action, retriggering is performed at least three times and a status update is sent upon detecting a failure.

Figure 12:
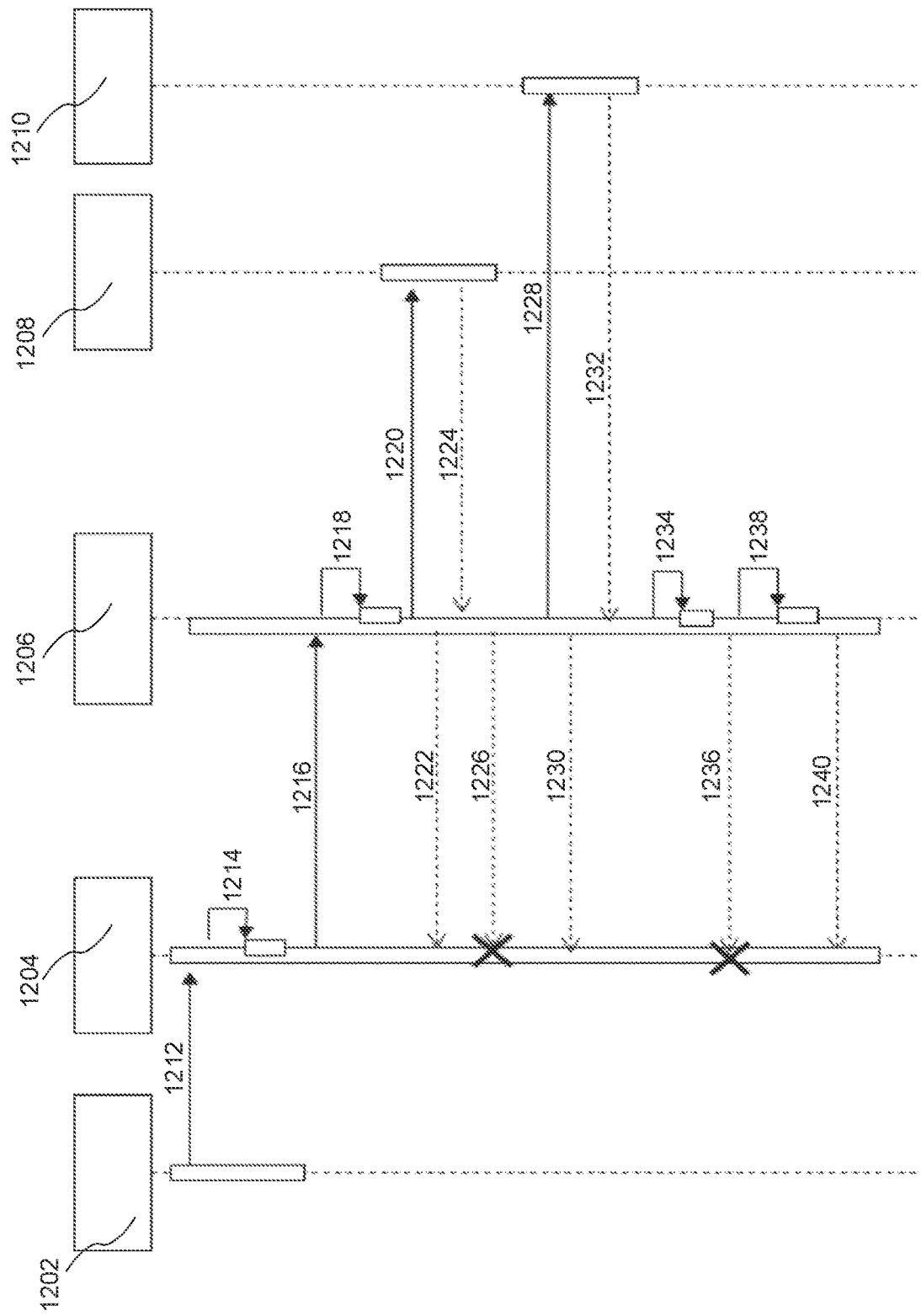
FIG. 12 illustrates a sequence diagram of a tenant cluster movement i.e compute cluster, of the system of FIG. 1 according to some embodiments herein.

FIG. 12 illustrates a sequence diagram of a tenant cluster movement i.e. compute cluster, of the system 100 of FIG. 1 according to some embodiments herein. The sequence diagram includes a user interface 1202, a tenant module 1204, a visual workflow 1206, a compute cluster 1208, and a cloudflare 1210. At a step 1212, tenant movement is initiated. At a step 1214, cluster details are updated. At a step 1216, cluster movement is triggered. At a step 1218, cluster information is obtained. At a step 1220, tenant mapping is performed and a status update is sent at a step 1222. On failure of tenant mapping at a step 1224, the tenant mapping action is terminated at a step 1226. At a step 1228, DNS entry remapping is performed and a status update is sent at a step 1230. On failure of DNS entry remapping at a step 1232, re-triggering is performed at a step 1234. The DNS entry creation action is terminated at a step 1236 on failure after retriggering at a step 1234. At a step 1238, an email is sent and a status update regarding the email communication is sent at a step 1240. Tenant cluster movement is performed by updating cluster details and triggering cluster movement. Cluster information is obtained to perform tenant mapping. DNS entry is remapped and an email is sent. On failure of an action, retriggering is performed at least three times and a status update is sent upon completing an action.

Figure 13:
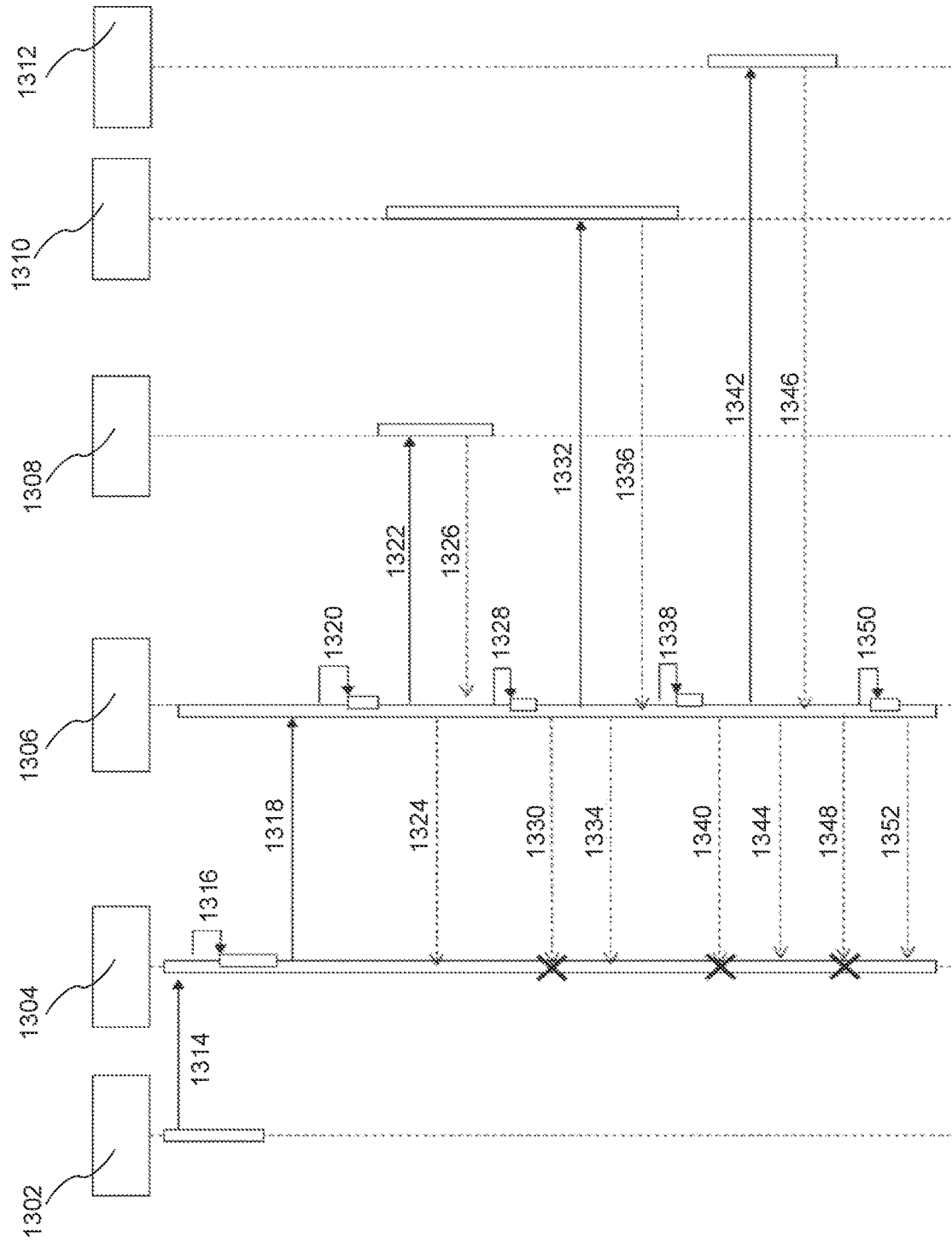
FIG. 13 illustrates a sequence diagram of a tenant cluster movement i.e. Database, DB cluster, of the system of FIG. 1 according to some embodiments herein.

FIG. 13 illustrates a sequence diagram of a tenant cluster movement i.e. Database, DB cluster, of the system 100 of FIG. 1 according to some embodiments herein. The sequence diagram includes a user interface 1302, a tenant module 1304, a visual workflow 1306, a DB source cluster 1308, a DB destination cluster 1310, and a compute cluster 1312. At a step 1314, tenant movement is initiated. At a step 1316, cluster details are updated. At a step 1318, cluster movement is triggered. At a step 1320, cluster information is obtained. At a step 1322, tenant dump is taken and a status update is sent at a step 1324. On failure of tenant dump at a step 1326, re-triggering is performed at a step 1328. The tenant dumb action is terminated at a step 1330 on failure after re-triggering at a step 1328. At a step 1332, DBdump restoring is performed and a status update is sent at a step 1334. On failure of restoring DBdump at a step 1336, re-triggering is performed at a step 1338. The DBdump restoring action is terminated at a step 1340 on failure after retriggering at a step 1338. At a step 1342, tenant mapping is performed and a status update is sent at a step 1344. On failure of tenant mapping at a step 1346, the tenant mapping action is terminated at a step 1348. At a step 1350, an email is sent and a status update regarding the email communication is sent at a step 1352. Tenant cluster movement is performed by updating cluster details and triggering cluster movement. Cluster information is obtained. Tenantdump is taken and DBdump is restored. Tenant mapping is performed and an email is sent. On failure of an action, retriggering is performed at least three times and a status update is sent upon completing an action.

Figure 14:
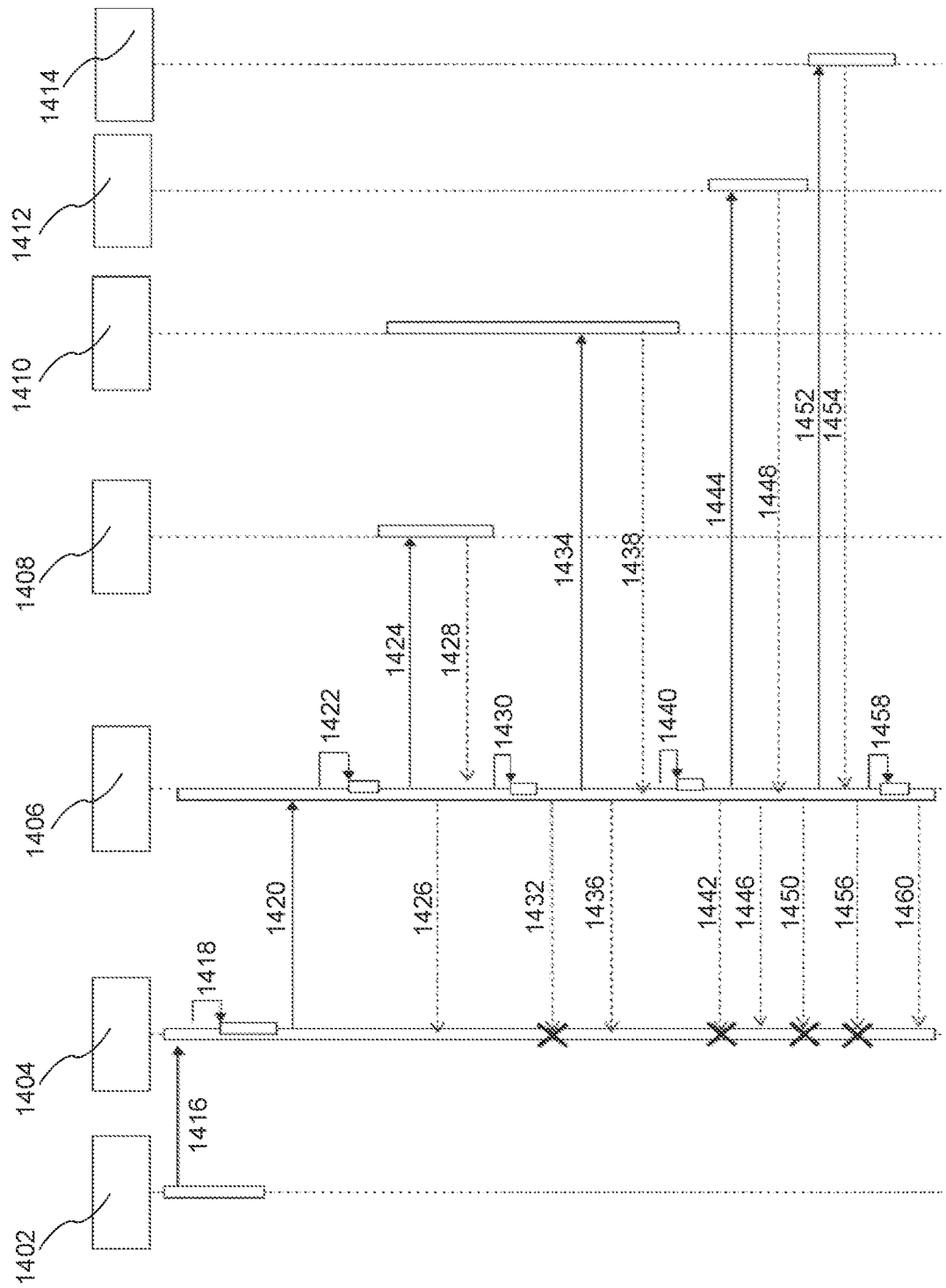
FIG. 14 illustrates a sequence diagram of a tenant cluster movement i.e. compute and DB cluster, of the system of FIG. 1 according to some embodiments herein.

FIG. 14 illustrates a sequence diagram of a tenant cluster movement i.e. compute and DB cluster, of the system 100 of FIG. 1 according to some embodiments herein. The sequence diagram includes a user interface 1402, a tenant module 1404, a visual workflow 1406, a DB source cluster 1408, a DB destination cluster 1410, a compute cluster 1412, and a cloudflare 1414. At a step 1416, tenant movement is initiated. At a step 1418, cluster details are updated. At a step 1420, cluster movement is triggered. At a step 1422, cluster information is obtained. At a step 1424, tenant dump is taken and a status update is sent at a step 1426. On failure of tenant dump at a step 1428, re-triggering is performed at a step 1430. The tenant dumb action is terminated at a step 1432 on failure after re-triggering at a step 1428. At a step 1434, DBdump restoring is performed and a status update is sent at a step 1436. On failure of restoring DBdump at a step 1438, re-triggering is performed at a step 1440. The DBdump restoring action is terminated at a step 1442 on failure after retriggering at a step 1440. At a step 1444, tenant mapping is performed and a status update is sent at a step 1446. On failure of tenant mapping at a step 1448, the tenant mapping action is terminated at a step 1450. At a step 1452, DNS entry remapping is performed. On failure of DNS entry remapping at a step 1454, the DNS entry remapping action is terminated at a step 1456. At a step 1458, an email is sent and a status update regarding the email communication is sent at a step 1460. Tenant cluster movement is performed by updating cluster details and triggering cluster movement. Cluster information is obtained. Tenantdump is taken and DBdump is restored. Tenant mapping is performed. DNS entry is remapped and an email is sent. On failure of an action, retriggering is performed at least three times and a status update is sent upon completing an action.

Figure 15:
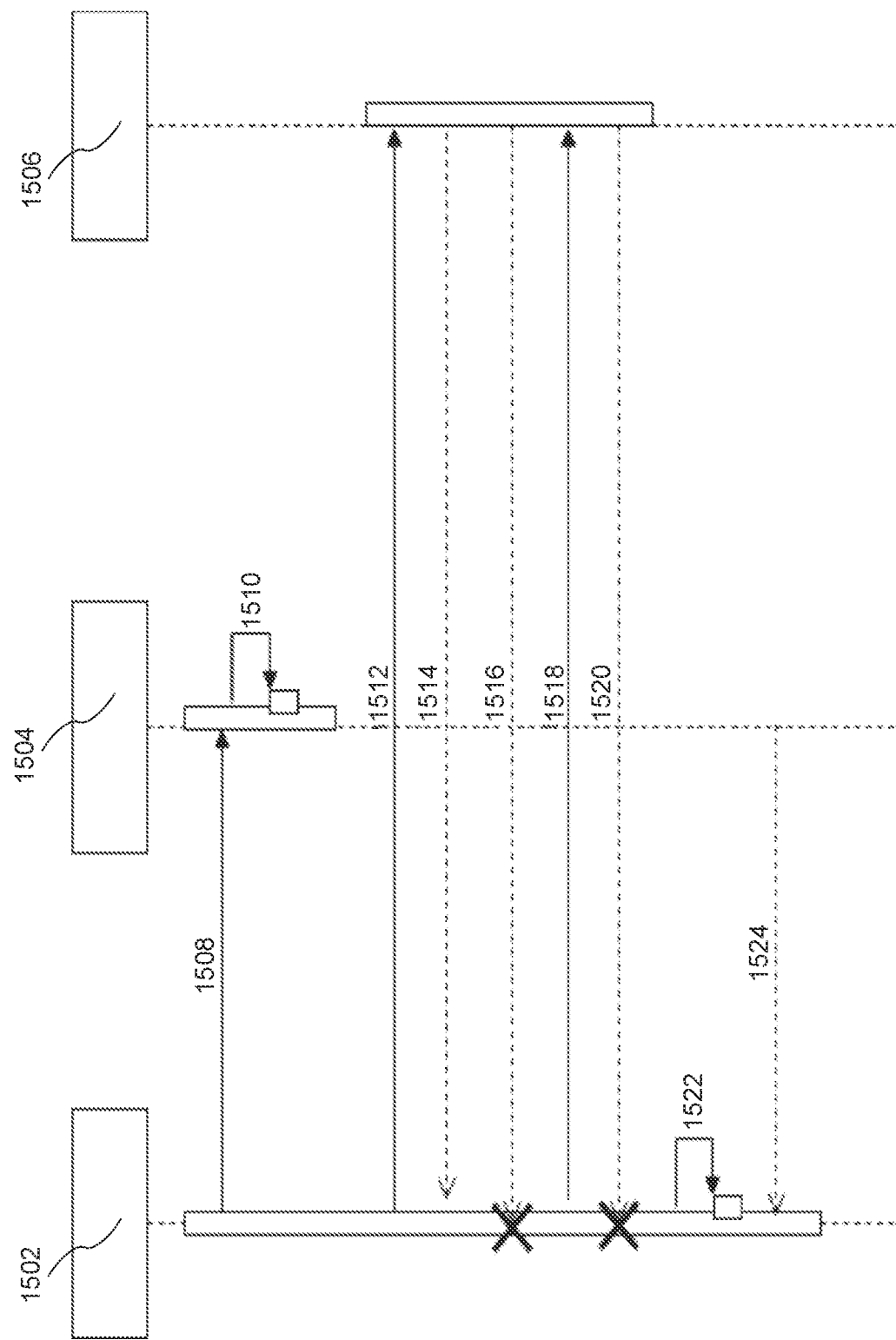
FIG. 15 illustrates a sequence diagram of a tenant trial extension of the system of FIG. 1 according to some embodiments herein.

FIG. 15 illustrates a sequence diagram of a tenant trial extension of the system 100 of FIG. 1 according to some embodiments herein. The sequence diagram includes a visual workflow 1502, a tenant module 1504, and a compute cluster 1506. At a step 1508, cluster details are obtained. At a step 1510, license is generated. At a step 1512, license is activated and a status update is sent at a step 1514. On failure, license activation action is terminated at a step 1516. At a step 1518, sanity check running is performed. On failure, sanity check running action is terminated at a step 1520. At a step 1522, an email is sent and a status update regarding the email communication is sent at a step 1524. Cluster details are obtained to generate a license. The license is activated and a sanity check is performed. Status update is sent upon completing an action.

Figure 16:
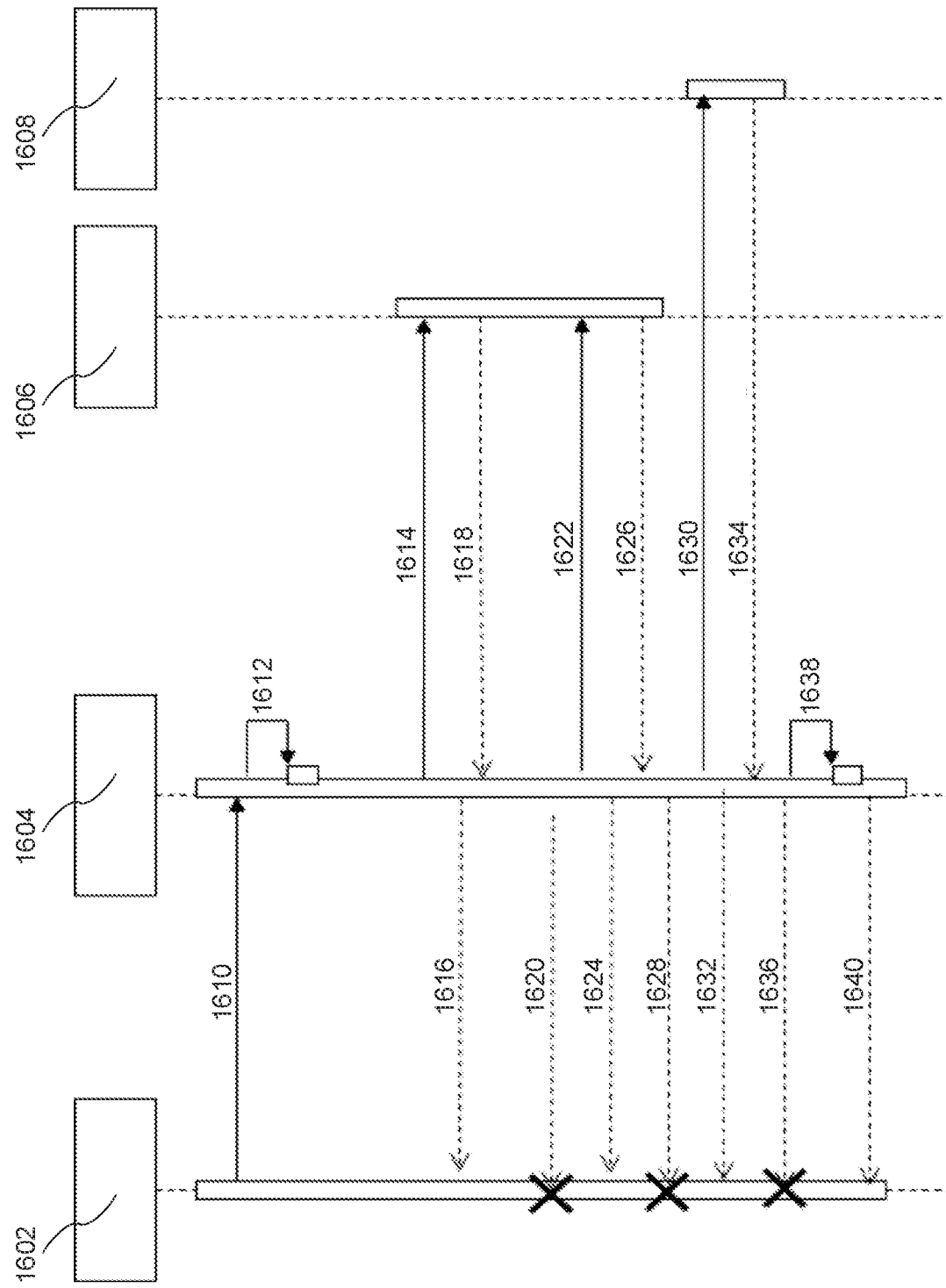
FIG. 16 illustrates a sequence diagram of a tenant deletion of the system of FIG. 1 according to some embodiments herein.

FIG. 16 illustrates a sequence diagram of a tenant deletion of the system 100 of FIG. 1 according to some embodiments herein. The sequence diagram includes a tenant module 1602, a visual workflow 1604, a compute cluster 1606, and a cloudflare 1608. At a step 1610, deletion is triggered. At a step 1612, cluster details are obtained. At a step 1614, tenant mapping is removed and a status update is sent at a step 1616. On failure of tenant mapping removal at a step 1618, tenant mapping removal action is terminated at a step 1620. At a step 1622, topics removal is performed and a status update is sent at a step 1624. On failure of topics removal at a step 1626, topics removal action is terminated at a step 1628. At a step 1630, DNS entry is removed and a status update is sent at a step 1632. On failure of DNS entry removal at a step 1634, DNS entry removal action is terminated at a step 1636. At a step 1638, an email is sent and a status update regarding the email communication is sent at a step 1640. Deletion is triggered. Cluster details are obtained and the tenant map is removed. Topics and DNS entries are also removed. A status update is sent upon completing an action.

Figure 17:
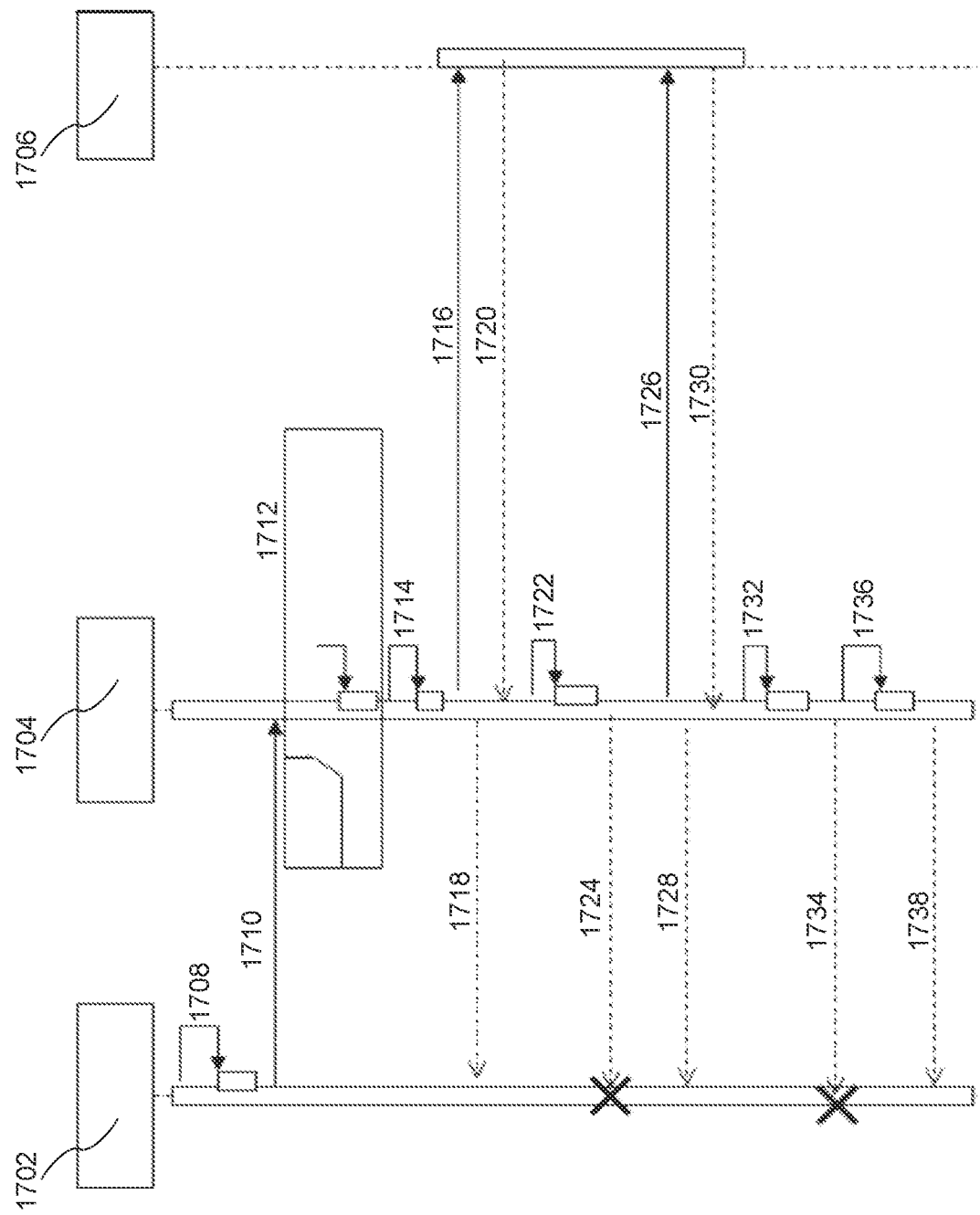
FIG. 17 illustrates a sequence diagram of a licensed tenant upgrade of the system of FIG. 1 according to some embodiments herein.

FIG. 17 illustrates a sequence diagram of a licensed tenant upgrade of the system 100 of FIG. 1 according to some embodiments herein. The sequence diagram includes a tenant module 1702, a visual workflow 1704, and a compute cluster 1706. At a step 1708, tenant information is updated. At a step 1710, upgrade is triggered. At a step 1712, approval process is performed. The approval process may be optional. At a step 1714, cluster information is obtained. At a step 1716, a tenant mapping is performed and a status update is sent at a step 1718. On failure of tenant mapping at a step 1720, re-triggering is performed at a step 1722. On failure of tenant mapping after re-triggering, at a step 1724, the tenant mapping action is terminated. At a step 1726, license upgrading is performed and a status update is sent at a step 1728. On failure of license upgrading at a step 1730, re-triggering is performed at a step 1732. On failure of license upgrading after re-triggering the tenant mapping action is terminated at a step 1734. An email is sent at a step 1736 and a status update regarding email communication is sent at a step 1738. Tenant information is updated and the upgrade is triggered. On receiving approval, cluster information is obtained and tenant mapping is performed. The license is also upgraded. On failure of an action, retriggering is performed at least three times and a status update is sent upon completing an action.

Figure 18:
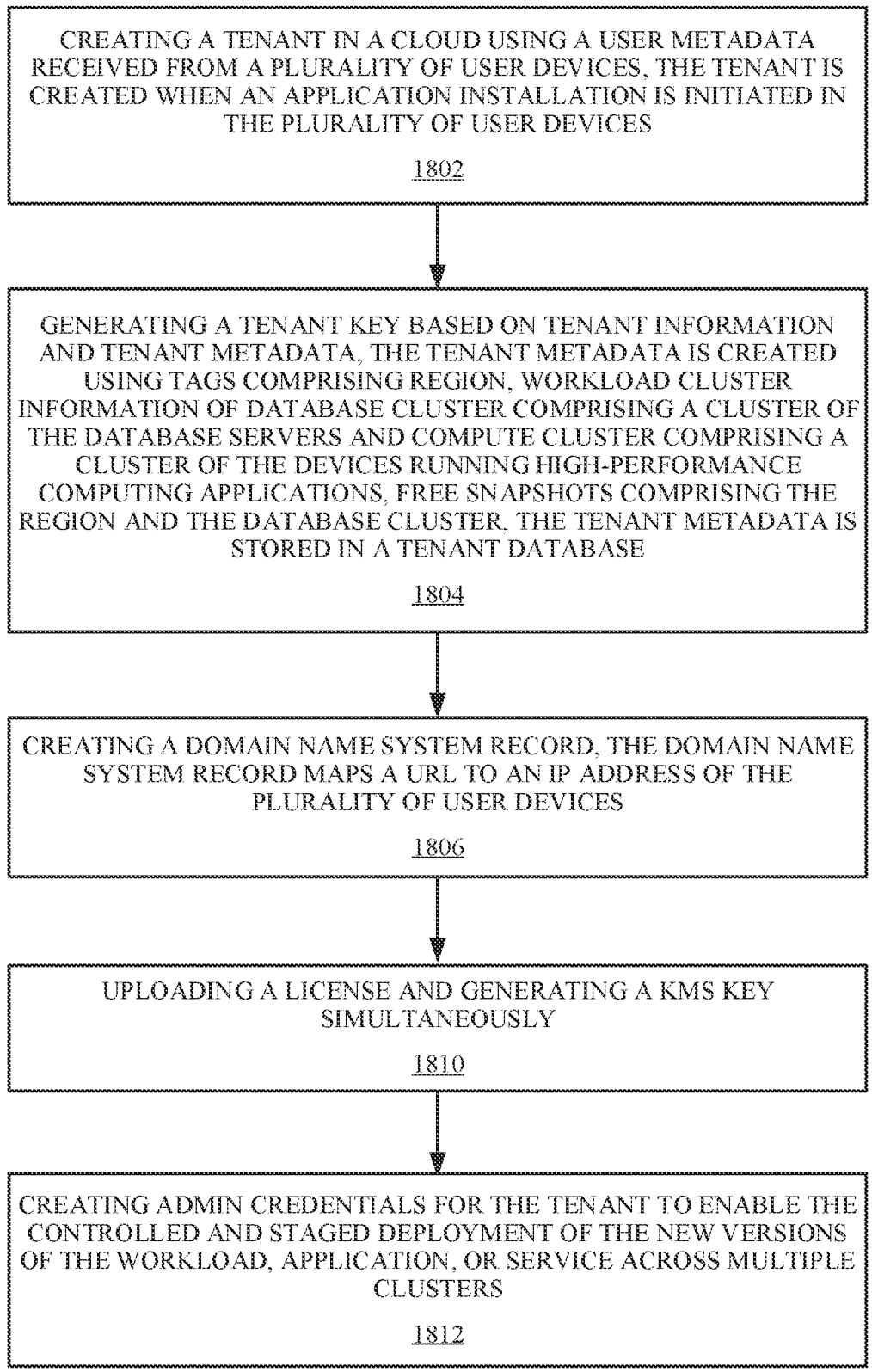
FIG. 18 illustrates a method for performing tenant provisioning to enable controlled and staged deployment of new versions of workload, application, or service across multiple clusters according to some embodiments herein.

FIG. 18 illustrates a method for performing tenant provisioning to enable controlled and staged deployment of new versions of workload, application, or service across multiple clusters according to some embodiments herein. At a step 1802, a tenant is created in a cloud using a user metadata received from a plurality of user devices. The tenant is created when an application installation is initiated in the plurality of user devices. At a step 1804, a tenant key is generated based on tenant information and tenant metadata. the tenant metadata is created using tags including region, workload cluster information of database cluster comprising a cluster of database servers and compute cluster including a cluster of devices running high-performance computing applications, free snapshots comprising the region and the database cluster. the tenant metadata is stored in a tenant database. At a step 1806, a snapshot of a tenant database comprising the tenant metadata is mapped to the tenant key. At a step 1808, a domain name system record is created. The domain name system record maps a url to an ip address of the plurality of user devices. At a step 1810, a license is uploaded and a key management service key is generated simultaneously. At a step 1812, admin credentials are created for the tenant to enable the controlled and staged deployment of the new versions of the workload, application, or service across multiple clusters.

Figure 19:
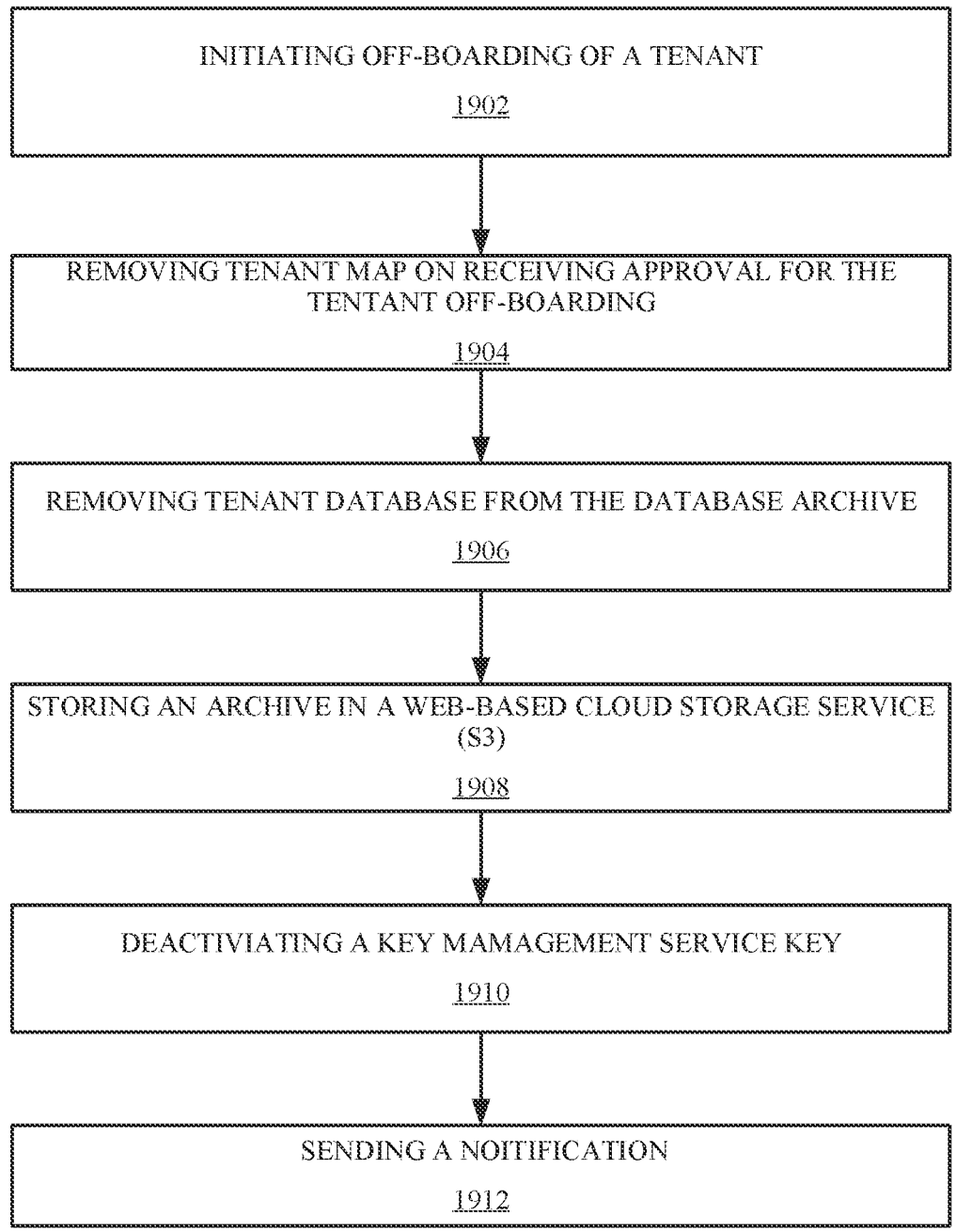
FIG. 19 illustrates a method of tenant-off boarding of the system of FIG. 1 according to some embodiments herein.

FIG. 19 illustrates a method of tenant-off boarding of the system 100 of FIG. 1 according to some embodiments herein. At a step 1902, off-boarding of a tenant is initiated. At a step 1904, the tenant map is removed on receiving approval for the tenant off-boarding. At a step 1906, the tenant database is removed from a database archive. At a step 1908, an archive is stored in a web-based cloud storage service (S3). At a step 1910, a Key Management Service key is deactivated. At a step 1912, a notification is sent. TCP protocol is used for DB-related communication across DB clusters.

The pre-condition to configure cluster details are admin user already created, EKS cluster provisioned and admin user has required access to the cluster. The pre-condition for tenant provisioning includes admin user already created, EKS cluster provisioned, the admin user has required access to the cluster, DB service is up and running, and tenant to be provisioned has already been created. The pre-condition for Tenant Mapping includes admin user already created, EKS cluster provisioned, the admin user has required access to the cluster, DB service is up and running, tenant to be provisioned has already been created and the tenant has been mapped to a specific database. The pre-condition for tenant inventory admin user already created. EKS cluster provisioned, the admin user has required access to the cluster and DB service is up and running. The pre-condition for Tenant Off-boarding includes admin user already created, EKS cluster provisioned, the admin user has required access to the cluster, and the tenant has already created. The pre-condition for Tenant upgrade includes admin user already created, EKS cluster provisioned, the admin user has required access to the cluster and tenant has already created. The pre-condition for tenant migration from Single tenant to multi-tenancy platform includes admin user already created, EKS cluster provisioned, the admin user has required access to the cluster, and DB Cluster provisioned. The pre-condition for tenant migration across clusters includes admin user already created, EKS cluster provisioned, the admin user has required access to the cluster, and DB Cluster provisioned. Tenants are moved to different clusters within the same region. The pre-condition for Tenant Trial Extension includes admin user already created, EKS cluster provisioned, the admin user has required access to the cluster and tenant has already created. The pre-condition for tenant deletion includes admin user already created, EKS cluster provisioned, the admin user has required access to the cluster and tenant has already created. The tenant will be marked as deleted and the tenant metadata will not be removed from the provisioning cluster.

Table 1 shows MongoDB design that describes the collection definition that will be used for tenant provisioning.

TABLE 1

| Collection name | Fields | Type |
|---|---|---|
| SaaS_Cluster_info | _id | ObjectId |
|  | cluster_name | string |
|  | region_name | string |
|  | status | string |
|  | cluster_type | string |
|  | plan_name | string |
|  | cluster_url | string |
|  | cluster_ip | string |
|  | priority | integer |
|  | cluster_access_details | object |
|  | created_by | string |
|  | modified_by | string |
|  | created_on | date |
|  | updated_on | date |
| SaaS_tenant | _id | ObjectId |
|  | cluster_info { cluster_name region_name } | Object |
|  | db_info { cluster_name region_name } | Object |
|  | tenant_id | string (case in-sensitive) |
|  | tenant_name | string |
|  | tenant_domain | string (case in-sensitive) |
|  | tenant_url | string |
|  | kmskey_identifier | string |
|  | status | string |
|  | previous_status | string |
|  | email | string |
|  | company_name | string |
|  | plan | Object {planName, noOfCerts} |
|  | user_type | string |
|  | stages_completed | array |
|  | expiry_date | date |
|  | created_by | string |
|  | modified_by | string |
|  | approved_by | string |
|  | created_on | date |
|  | modified_on | date |
|  | approved_on | date |
| saas_tenant_db | _id | objectid |
|  | db_name | string |
|  | cluster_name | string |
|  | tenant_id | string |
|  | archived_file | string |
|  | snapshotId | string |
|  | created_by | string |
|  | modified_by | string |
|  | approved_by | string |
|  | created_on | date |
|  | modified_on | date |
|  | approved_on | date |
| saas_plan | _id | objectid |
|  | plan_name | string |
|  | plan_type | string(FREE/ LICENSE) |
|  | no_of_certs | string |
|  | expiry_days | integer |
|  | created_on | date |
|  | modified_on | date |
| saas_tenant_plan | _id | objectid |
|  | tenant_id | string |
|  | plan_name | string |
|  | created_on | date |
|  | modified_on | date |

The saas_plan collection has to be pre-populated with plan details. The saas_tenant_db collection has to be populated by the job which is creating default tenant DB in the Mongo Atlas with db_name and cluster_name details.

Table 2 shows Redis design that describes the Redis data structure used to store the tenant information in the compute cluster. Redis Hashes, which is a map of key-value pairs, is used to store the tenant information.

TABLE 2

| Hash name | Key | Value |
|---|---|---|
| AVX_SAAS_TENANT_INFO | Tenant name | TenantInfo object |

Table 3 illustrates Tenant Onboarding API Exposed: Public, will be consumed by signup module [Marketing page], API: https://<IP>:<PORT>/avxapi/saas-tenant-register?gwkey=f000ca01&gwsource=external, Http-Method: POST.

TABLE 3

| Field | Description | Data Type | Mandatory | Default Value |
|---|---|---|---|---|
| email | Valid Email address | String | Yes | |
| name | Any alphanumeric text | String | Yes | |
| region | Any alphanumeric text | String | Yes | |
| domain | Valid domain name | String | Yes | |
| noOfCerts | Predefined values. Value retrieved from Tenant Plan Info | String | No | 1-100 |
| planName | Tenant plan name for provisioning. Supported values [Free,License]. Initial Tenant OnBoarding process, it will be "Free" | String | No | Free |
| comments | User defined text | String | No | |

Sample Payload

```
{
"payload":
{
"email": "karthik.v@barclays.com", "name": "Barclays",
"region": "CBE",
"noOfCerts": "1-100", "comments": "Test",
"domain":"barclays-domain.appviewx.com"
}
}
```

Sample Response

```
{
"response":
{
"tenantId": "barclays-domain.appviewx.com", "status";
"TRIGGERED_FOR_PROVISIONING"
},
```

-continued

```
"message": "Tenant provisioning process is triggered",
"appStatusCode": "SAAS_TENANT_005",
"tags": null, "headers": null
}
```

Table 4 includes Possible Http Status:

TABLE 4

| Http Status code | Use case | Response |
| --- | --- | --- |
| 200 | Successfully triggered tenant metadata creation | { "response": { "tenantId": "barclays-domain.appviewx.com", "status": "TRIGGERED_FOR_PROVISIONING" }, "message": "Tenant provisioning process is triggered", "appStatusCode": "SAAS TENANT_005", "tags": null, "headers": null } |
| 400 | 1. Invalid payload data 2.Any mandatory field is missing 3.Invalid data format Like Mail Id and domain should be in valid format | { "response": null, "message": "Invalid payload data.", "appStatusCode": "AVX-VLDTN-001", "tags": { "upstream_error": "true", "errors": [ { "field": "name", "message": "This field cannot be empty or null." }, { "field": "email", "message": "Should be valid Mail Id" }, { "field": "region", "message": "This field cannot be empty or null." "field": "domain", "message": "Should be valid domain" } ] }, "headers": null } |
| 400 | If domain name already exists, will get duplicate entry exception | { "response": null, "message": "Tenant details already exists", "appStatusCode": "SAAS TENANT_004", "tags": { "upstream_error": "true" }, "headers": null } |

API for Getting all active clusters is provided. Exposed: Internal, will be consumed by DB tenant snapshot provisioning module API: https://<IP>:<PORT>/avxapi/saas-cluster-get-all-by-status?gwkey=f000ca01& gwsource=external Http-Method: GET, queryParam:

| Key | Value | Mandatory |
| --- | --- | --- |
| status | ACTIVE | Optional. Default value will be ACTIVE |

Sample Response

```
{
"response": [ {
"clusterName": "appviewx-cluster-DB",
"region": "CBE",
"clusterType": "DB",
"status": "ACTIVE"
"url": "https://appviewx.db.com",
"ip": "10.161.0.98",
"priority": 0,
"accessDetails": null,
"createdBy": "admin",
"modifiedBy": null,
"createdOn": 1632339131112,
"updatedOn": null,
"tenants": null,
"planName": "FREE(100 cert)-FREE",
"_id": "614b84bb37798b5d96045570"
}'
{
"clusterName": "appviewx-cluster-Compute",
"region": "CBE",
"clusterType": "COMPUTE",
"status"; "ACTIVE",
"url": "https://appviewx.compute.com",
"ip": "10.161.0.98",
"priority": 0,
"accessDetails": null,
"createdBy": "admin",
"modifiedBy": null,
"createdOn": 1632339161096,
"updatedOn": null,
"tenants": null,
"planName": "FREE(100 cert)-FREE",
"_id": "614b84d937798b5d960457ca"
}
],
"message": null,
"appStatusCode": null, "tags": null,
"headers": null
}
```

Table 5 includes Possible Http Status:

TABLE 5

| Http Status code | Use case | Response |
| --- | --- | --- |
| 200 | Successfully fetched active cluster informations | {<br>"response": [ {<br>"clusterName": "appviewx-cluster-DB", "region": "CBE", "clusterType": "DB", 'status": "ACTIVE",<br>"url": "https://appviewx.db.com",<br>"ip": "10.161.0.98",<br>"priority": 0, |

TABLE 5-continued

| Http Status code | Use case | Response |
| --- | --- | --- |
|  |  | "accessDetails": null,<br>"createdBy": "admin",<br>"modifiedBy": null,<br>"createdOn": 1632339131112,<br>"updatedOn": null,<br>"tenants": null,<br>"planName" "FREE(100 cert)-FREE",<br>"_id": "614b84bb37798b5d96045570"<br>},<br>{<br>"clusterName": "appviewx-cluster-Compute",<br>"region": "CBE",<br>"clusterType": "COMPUTE",<br>"status": "ACTIVE",<br>"url": "https://appviewx.compute.com",<br>"ip": "10.161.0.98",<br>"priority": 0,<br>"accessDetails": null,<br>"createdBy": "admin",<br>"modifiedBy": null,<br>"createdOn": 1632339161096,<br>"updatedOn": null,<br>"tenants": null,<br>"planName": "FREE(100 cert)-FREE",<br>"_id "614b84d937798b5d960457ca" }<br>],<br>"message": null,<br>"appStatusCode": null, "tags": null,<br>"headers": null } |
| 500 | Invalid status value is passed in the query param. | {<br>"response": null,<br>"message": "Cluster status is not supported.", "appStatusCode": "SAAS_CLUSTER_010", "tags": { "Supported Cluster Status": [ "ACTIVE", "INACTIVE", "LIMIT_THRESHOLD_REACHED" ],<br>"upstream_error": "true" },<br>"headers": null<br>} |

API for cluster status update is provided. Exposed: Internal, will be consumed by DB tenant snapshot provisioning module API: https://<IP>:<PORT>/avxapi/saas-cluster-update?gwkey=f000ca01&gwsource=external Http Method: PUT.

Sample Payload

```
{
payload": {
"clusterName": "appviewx-cluster-Compute", "status": "ACTIVE"
} }
```

Sample Response

```
{
"response": true,
"message": "Cluster entries updated successfully", "appStatusCode":
"SAAS CLUSTER 007",
"tags": null, "headers": null
}
```

Table 6 includes Possible Http Status:

TABLE 6

| Http Status code | Use case | Response |
|---|---|---|
| 200 | Successfully updated cluster details | { "response": true, "message": "Cluster entries updated successfully", "appStatusCode": "SAAS CLUSTER 007", "tags": null, "headers": null } |
| 400 | Given cluster not found | { "response": null, "message": "No cluster found", "appStatusCode": "SAAS CLUSTER_011", "tags": { "upstream_error": "true" }, "headers": null } |

API to get all Tenant DB details is provided. Exposed: Internal, will be consumed by DB tenant snapshot provisioning module. API: https://<IP>:<PORT>/avxapi/saas-tenantdb-getall?gwkey=f000ca01&gwsource=external, Http Method: GET Sample Response

```
{
"response": [
{
"tenantId": "scb-domain.appviewx.com",
"clusterName": "appviewx-cluster-DB",
"dbName": "DB1",
"archivedFile": null,
"createdBy": "admin",
"modifiedBy": null,
"approvedBy": null,
"createdOn": 1632339632806,
"modifiedOn": null,
"approvedOn": null,
"taken": true,
"_id": "614b86b037798b5d9604838b"
},
{
"tenantId": "barclays-domain.appviewx.com",
"clusterName": "appviewx-cluster-DB",
"dbName": "DB2",
"archivedFile": null,
"createdBy": "admin",
"modifiedBy": null,
"approvedBy": null,
"createdOn": 1632339632806,
"modifiedOn": null,
"approvedOn": null,
"taken": true,
"_id": "614b86b037798b5d9604838c"
},
{
"tenantId": "facebook-domain.appviewx.com",
"clusterName": "appviewx-cluster-DB"
"dbName": "DB3",
"archivedFile": null,
"createdBy": "admin",
"modifiedBy": null,
"approvedBy": null,
"createdOn": 1632339632806,
"modifiedOn": null,
"approvedOn": null,
"taken": true,
"_id": "614b86b037798b5d9604838d"
},
],
"message": "Tenant DB details are fetched successfully",
"appStatusCode":
"SAAS_TENANT_DB_008",
"tags": null, "headers": null
}
```

Table 7 includes possible Http Status.

| Http Status Code | Use case | Response |
|---|---|---|
| 200 | Successfully retrieved Tenant DB details | { "response": [ { "tenantId": "scb-domain.appviewx.com", "clusterName": "appviewx-cluster-DB", "db Name": "DB1", "archivedFile": null, "createdBy": "admin", "modifiedBy": null, "approvedBy": null, "createdOn": 1632339632806, "modifiedOn": null, "approvedOn": null, "taken": true, "_id", "614b86b037798b5d9604838b" }, { "tenantId" "barclays-domain.appviewx.com", "clusterName": "appviewx-cluster-DB", "dbName": "DB2", "archivedFile": null, "createdBy": "admin", "modifiedBy": null, "approvedBy": null, "createdOn": 1632339632806, "modifiedOn": null, "approvedOn": null, "taken": true, "_id": "614b86b037798b5d9604838c" }, { "tenantId": "facebook-domain.appviewx. com", "clusterName": "appviewx-cluster-DB", "dbName": "DB3", "archivedFile": null, "createdBy": "admin", "modifiedBy": null, "approvedBy": null, "createdOn": |

-continued

| Http Status Code | Use case | Response |
|---|---|---|
| | | 1632339632806, "modifiedOn": null, "approvedOn": null, "taken": true, "_id": "614b86b037798b5d9604838d" } ], "message": "Tenant DB details are fetched successfully", "appStatusCode": "SAAS_TENANT_DB_008", "tags": null, "headers": null } |
| 500 | In cause database access fails, will get this exception | { "response": null, "message": "Could not fetch tenant db details", "appStatusCode": "SAAS_TENANT_DB_002", "tags": { "upstream_error": "true" }, "headers": null } |

API to Propagate Tenant metadata to plugins is provided. API name: saas-tenant-metadata-propagate Cluster: Workload Cluster, Exposed (Only to Provisioning Cluster): Internal, will be consumed by the provisioning cluster to propagate the tenant metadata to all plugins. URI: https://<IP>:<PORT>/avxapi/saas-tenant-metadata-propagate HTTP Method: PUT Sample Request

```
{
"payload": {
"_id": "test.appviewx.io", "db_config": {
"database_host": "host",
"snapshot_id": "twertu78",
"authentication_db": "test",
"username": "user",
"password": "plain-text-password"
},
"plan_name" :"test",
"plan_type" :"test
}
}
```

Sample Response

```
{
"response": {
"status": "SUCCESS"
},
"message": null,
"appStatusCode": null
"tags": null,
"headers": null
}
```

Table 8 includes possible Http Status:

| Http Status code | Use case | Response |
|---|---|---|
| 200 | Successfully updated the tenant metadata to Redis. | { "response": { "status": "SUCCESS" }, "message": null, "appStatusCode": "", "tags": null, "headers": null } |
| 400 | Validation failure | { "response": { "status": "FAILURE" }, "message": null, "appStatusCode": "SAAS_TENANT_METADATA_002", "tags": null, "headers": null } |
| 500 | Redis connection failed | { "response": { "status": "FAILURE" }, "message": null, "appStatusCode": "SAAS_TENANT_METADATA_003", "tags": null, "headers": null } |

API to remove tenant metadata from cache is provided. API name: saas-tenant-metadata-evict Cluster: Workload Cluster. Exposed (Only to Provisioning Cluster): Internal, URI: https://<IP>:<PORT>/avxapi/saas-tenant-metadata-evict HTTP Method: DELETE, Query params: tenantId Sample Response

```
{
"response": {
"status": "SUCCESS"
},
"message": null,
"appStatusCode": null "tags": null,
"headers": null
}
```

Table 9 includes possible Http status:

| Http Status code | Use case | Response |
|---|---|---|
| 200 | Successfully deleted the tenant metadata in Redis | { "response": { "status": "SUCCESS" }, "message": null, "appStatusCode": null "tags": null, "headers": null } |
| 400 | Validation failure | { "response": null "message": null, "appStatusCode": "SAAS_TENANT_METADATA_002", "tags": null, "headers": null } |

-continued

| Http Status code | Use case | Response |
|---|---|---|
| 500 | Redis connection failed | {<br>"response": null<br>"message": null,<br>"appStatusCode":<br>"SAAS_TENANT_METADATA_003",<br>"tags": null,<br>"headers": null<br>} |

API to MoveTenant metadata from one redis cache key to another key: API name: saas-tenant-metadata-move Cluster: Workload Cluster, Exposed (Only to Provisioning Cluster): Internal, to support canary/production modes. URI: https://<IP>:<PORT>/avxapi/saas-tenant-metadata-move, HTTP Method: POST.

Sample Request

```
{
"payload" :{
"source" : "PRODUCTION", <enum> "destination":
"CANARY", <enum>
"tenantIds": ["canary-tenant"] <List<String>> }
}
```

Sample Response

```
{
"response": {
"status": "SUCCESS"
},
"message": null,
"appStatusCode": null
"tags": null,
"headers": null
}
```

Table 10 includes possible Http status.

| Http Status code | Use case | Response |
|---|---|---|
| 200 | Successfully moved tenant metadata from one redis cache to another, | {<br>"response": {<br>"status": "SUCCESS" },<br>"message": null,<br>"appStatusCode": null "tags":<br>null,<br>"headers": null<br>} |
| 500 | Unable to perform write operation in Redis | {<br>"response": null "message":<br>null,<br>"appStatusCode":<br>"REDIS_102", "tags": null,<br>"headers": null<br>} |

-continued

| Http Status code | Use case | Response |
|---|---|---|
| 500 | Unable to evict data in Redis | {<br>"response": null "message":<br>null,<br>"appStatusCode":<br>"REDIS_103",<br>"tags": null,<br>"headers": null<br>} |

API for sanity check is provided. API name: saas-tenant-sanity-check Cluster: Workload Cluster, Exposed (Only to Provisioning Cluster): Internal, URI: https://<IP>:<PORT>/avxapi/saas-tenant-sanity-check HTTP Method: GET, Query params: tenantId Sample Response

```
{
"response": {
"tenantInfoAvailableInCache" :"true",
"canConnectToTenantDb" :"true",
"kmsKeyGenerated" : "true",
"canEncryptDecrypt" :"true"
}
"message": null,
"appStatusCode": null,
"tags": null,
}
```

Table 11 includes possible Http status.

TABLE 11

| Http Status code | Use case | Response |
|---|---|---|
| 200 | All validations passed | {<br>"response": {<br>"tenantInfoAvailableInCache" :"true",<br>"canConnectToTenantDb" :"true",<br>"kmsKeyGenerated" : "true",<br>"canEncryptDecrypt" :"true" }<br>"message": null,<br>"appStatusCode": null, "tags": null,<br>} |
| 400 | Any validation failure | {<br>"response":null<br>"message": Validation failed",<br>"appStatusCode":<br>"SAAS_TENANT_METADATA_002",<br>"tags": {<br>"upstream_error": "true" },<br>"headers": null<br>} |
| 500 | Redis/Mongo connectivity failure | {<br>"response": null,<br>"message": "DB connectivity failed ",<br>"appStatusCode":<br>"SAAS_TENANT_METADATA_005",<br>"tags": {<br>"upstream_error": "true" },<br>"headers": null<br>} |

API to get KMS key is described. API name: saas-tenant-get-kms-key Cluster: Workload Cluster, Exposed (Only to Provisioning Cluster): Internal, URI: https://<IP>:<PORT>/avxapi/saas-tenant-kms-get-key HTTP Method: GET Query params: tenantId.

Sample Response

```
{
    "response": {
        "accessKeyID": "AKIAVUTMLHQBFQQVTX7I",
        "secretAccessKey":
        "BXU/ujmlqwt0aD4f5H+Zv4Rej04aq2Fpj8AUL08A",
        "region": "us-west-1",
        "masterKeyId": "e9c84f1f-3259-4e63-bbbe-fa955c26287f"
    },
    "message": null,
    "appStatusCode": null, "tags": null,
    "headers": null
}
```

Table 12 includes possible Http status.

TABLE 12

| Http Status code | Use case | Response |
|---|---|---|
| 200 | All validations passed | `{ "response": { "accessKeyID": "AKIAVUTMLHQBFQQVTX7I", "secretAccessKey": "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", "region": "us-west-1", "masterKeyId": "e9c84f1f-3259-4e63-bbbe-fa955c26287f" }, "message": null, "appStatusCode": null, "tags": null, "headers": null }` |
| 400 | Any validation failure | `{ "response":null "message": Validation failed", "appStatusCode": "SAAS_TENANT_METADATA_002", "tags": { "upstream_error": "true" }, "headers": null }` |

Figure 20:
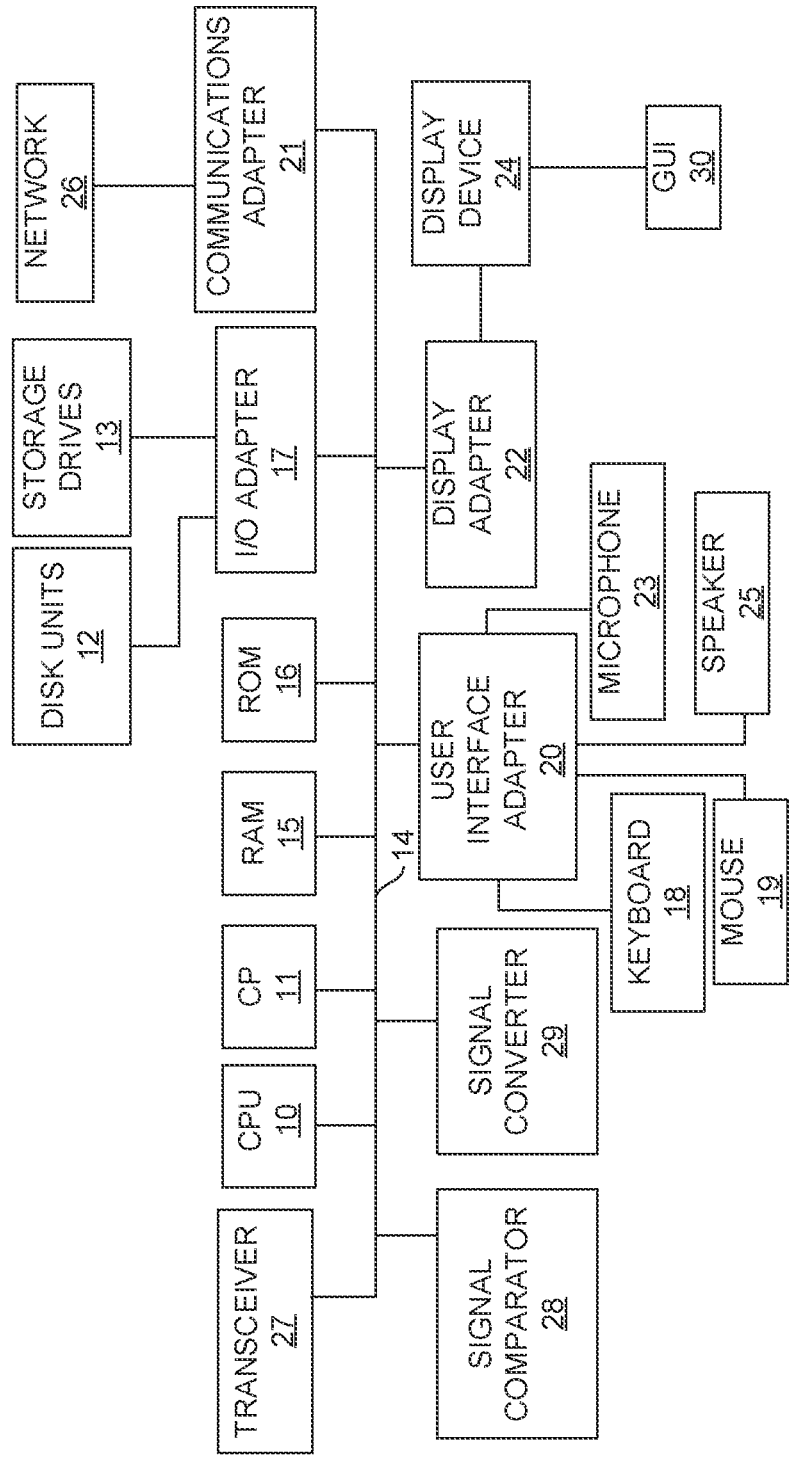
FIG. 20 is a schematic diagram of a computer architecture in accordance with the embodiments herein.

A representative hardware environment for practicing the embodiments herein is depicted in FIG. 20, with reference to FIGS. 1 through 19. This schematic drawing illustrates a hardware configuration of a server 114/computer system in accordance with the embodiments herein. The server 114/computer includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The server 114/computer can read the inventive instructions on the program storage devices and follow these instructions to execute the methodology of the embodiments herein. The server 114/computer system further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for performing tenant provisioning to enable controlled and staged deployment of new versions of workload, application, or service across multiple clusters, wherein the system comprising,
a memory unit that stores a database and a set of instructions; and
a processor that executes the set of instructions and is configured to:
create a tenant in a cloud using a user metadata received from a plurality of user devices, wherein the tenant is created when an application installation is initiated in the plurality of user devices;
generate a tenant key based on tenant information and tenant metadata, wherein the tenant metadata is created using tags comprising region, workload cluster information of database cluster comprising a cluster of database servers and compute cluster comprising a cluster of devices running high-performance computing applications, free snapshots comprising the region and the database cluster, wherein the tenant metadata is created by associating the tags with resources within the database cluster, wherein the tenant metadata is stored in a tenant database;
map a snapshot of the tenant database comprising the tenant metadata to the tenant key;
create a Domain Name System record, wherein the Domain Name System record maps a URL to an IP address of the plurality of user devices;
upload a license and generate a Key Management Service key simultaneously; and
enabling the controlled and staged deployment of the new versions of the workload, application, or service across multiple clusters by creating admin credentials for the tenant.

2. The system of claim 1, wherein the system is configured to install the application in the plurality of user devices by obtaining the user metadata using a distributed publish-subscribe messaging system, wherein the application installation in the plurality of user devices is facilitated through gateway, web and plugins.

3. The system of claim 1, wherein the system is configured to map the tenant by (i) binding the tenant database with the workload cluster, (ii) publishing the tenant information, and (iii) pushing the published tenant information to the plurality of user devices.

4. The system of claim 1, wherein the tenant information comprises tenant description, tenant contact information, tenant permissions and tenant usage.

5. The system of claim 1, wherein the system is configured to perform mutual TLS authentication when the Domain Name System record creation is failed.

6. The system of claim 1, wherein the system is configured to perform off-boarding of the tenant by (i) removing the tenant mapping, (ii) removing the tenant database from a database archive, wherein the archive is stored in a web-based cloud storage service (S3), (iii) deactivating the Key Management Service key, and (iv) sending a notification to the plurality of user devices.

7. The system of claim 1, wherein the system is configured to perform tenant upgrading during a trial period by (i) updating the tenant information, (ii) creating an updated tenant metadata, (iii) obtaining the compute cluster information, (iv) perform tenant mapping using the compute cluster information, (v) upgrading the license and (vi) sending the notification to the plurality of user devices.

8. The system of claim 7, wherein the system is configured to perform the tenant upgrading after trial period with data retention by (i) updating the tenant information obtained from the archive, (ii) restoring tenant database with the updated information, (iii) obtaining the compute cluster information, (iv) performing the tenant mapping using the compute cluster information, (v) upgrading the license and (vi) sending the notification to the plurality of user devices.

9. The system of claim 8, wherein the system is configured to perform the tenant upgrading after the trial period with data retention expiry by (i) updating the tenant information obtained from the archive, (ii) performing encryption of the tenant information, (iii) obtaining the compute cluster information, (iv) perform tenant mapping using the compute cluster information, (v) upgrading the license and generating Key Management Service key simultaneously, (vi) creating admin credentials for the tenant, and (vii) sending the notification to the plurality of user devices.

10. The system of claim 1, wherein the system is configured to perform database restoration for single tenant to multi-tenancy platform migration by (i) obtaining the database cluster and the computer cluster information, (ii) running of migration workflow using the cluster information and free snapshot ID (iii) mounting database from S3 and restoring the tenant database, (iiv) perform the tenant mapping using the database cluster and the computer cluster information, and (iv) upgrading the license.

11. The system of claim 1, wherein the system is configured to perform the tenant provisioning for single tenant to multi-tenancy platform migration by (i) creating the tenant and obtaining the tenant metadata, (ii) obtaining the compute cluster information, (iii) performing the tenant mapping using the compute cluster information, (iv) creating the Domain Name System record, wherein the Domain Name System record maps a URL to an IP address of the plurality of user devices, (v) resetting of the admin credentials, and (vi) encrypting the admin credentials.

12. The system of claim 1, wherein the system is configured to perform the Tenant cluster movement within compute cluster by (i) updating the compute cluster information and triggering the cluster movement, (iii) performing the tenant mapping using the compute cluster information, (iv) remapping the Domain Name System record, and (v) sending the notification to the plurality of user devices.

13. The system of claim 1, wherein the system is configured to perform the tenant cluster movement within database cluster by (i) updating the database cluster information and triggering the cluster movement, (iii) obtaining tenant dump and restoring database dump in the database cluster, (iv) performing the tenant mapping using the updated database cluster information, and (v) sending the notification to the plurality of user devices.

14. The system of claim 1, wherein the system is configured to perform the tenant trial extension by (i) obtaining the compute cluster information and generating the license, (ii) activating the license, and (iii) sending the notification to the plurality of user devices.

15. The system of claim 1, wherein the system is configured to perform the tenant deletion by (i) obtaining the compute cluster information, (ii) deleting the tenant mapping using the compute cluster information, (iii) removing topics and Domain Name System entry record, and (iv) sending the notification to the plurality of user devices.

16. The system of claim 1, wherein the system is configured to perform licensed tenant upgrade by (i) updating the tenant information and triggering the upgrade, (ii) performing the tenant mapping using the compute cluster information, (iii) upgrading the license, and (iv) sending the notification to the plurality of user devices.

17. A method for performing tenant provisioning to enable controlled and staged deployment of new versions of workload, application, or service across the multiple clusters, wherein the method comprises:
   creating a tenant in a cloud using a user metadata received from a plurality of user devices, wherein the tenant is created when an application installation is initiated in the plurality of user devices;
   generating a tenant key based on tenant information and tenant metadata, wherein the tenant metadata is created using tags comprising region, workload cluster information of database cluster comprising a cluster of the database servers and compute cluster comprising a cluster of the devices running high-performance computing applications, free snapshots comprising the region and the database cluster, wherein the tenant metadata is stored in a tenant database;
   mapping a snapshot of the tenant database comprising the tenant metadata to the tenant key;
   creating a Domain Name System record, wherein the Domain Name System record maps a URL to an IP address of the plurality of user devices;
   uploading a license and generating a Key Management Service key simultaneously; and
   enabling the controlled and staged deployment of the new versions of the workload, application, or service across multiple clusters by creating admin credentials for the tenant.

18. A one or more non-transitory computer-readable storage mediums storing the one or more sequences of instructions, which when executed by the one or more processors, causes to perform a method for performing tenant provisioning to enabling controlled and staged deployment of new versions of workload, application, or service across the multiple clusters by (a) creating a tenant in a cloud using a user metadata received from a plurality of user devices, wherein the tenant is created when an application installation is initiated in the plurality of user devices, and (b) generating a tenant key based on tenant information and tenant metadata, wherein the tenant metadata is created using tags comprising region, workload cluster information of database cluster comprising a cluster of the database servers and compute cluster comprising a cluster of the devices running high-performance computing applications, free snapshots comprising the region and the database cluster, wherein the tenant metadata is stored in a tenant database, (c) mapping a snapshot of the tenant database comprising the tenant metadata to the tenant key, (d) creating a Domain Name System record, wherein the Domain Name System record maps a URL to an IP address of the plurality of user devices, (e) uploading a license and generating a Key Management Service key simultaneously, and (f) enabling controlled and staged deployment of new versions of workload, application, or service across the multiple clusters by creating admin credentials for the tenant.

* * * * *